US006317025B1

(12) United States Patent
Leon et al.

(10) Patent No.: US 6,317,025 B1
(45) Date of Patent: *Nov. 13, 2001

(54) PROGRAMMABLE LOCK AND SECURITY SYSTEM THEREFOR

(75) Inventors: Jeremy Phelps Leon, Morris Plains, NJ (US); Lynn Frederick Amis, Omaha, NE (US); Jan Nazalewicz, Mahwah; Thomas Glenn McKee, Jr., Passaic, both of NJ (US)

(73) Assignee: E. J. Brooks Company, Livingston, NJ (US)

( * ) Notice: Subject to any disclaimer, the term of this patent is extended or adjusted under 35 U.S.C. 154(b) by 36 days.

This patent is subject to a terminal disclaimer.

(21) Appl. No.: 09/590,989

(22) Filed: Jun. 9, 2000

Related U.S. Application Data

(63) Continuation of application No. 08/982,434, filed on Dec. 2, 1997, now Pat. No. 6,097,306.

(60) Provisional application No. 60/032,293, filed on Dec. 3, 1996.

(51) Int. Cl.[7] ..................................................... H04Q 17/00

(52) U.S. Cl. .................... 340/5.21; 340/10.1; 340/10.52; 235/380; 235/382

(58) Field of Search .................................. 340/5.21, 10.1, 340/10.52; 235/380, 382

(56) References Cited

U.S. PATENT DOCUMENTS 4,262,284 4/1981 Stieff et al. .
4,727,368 2/1988 Larson et al. .
4,750,197 6/1988 Denekamp et al. .
4,766,419 8/1988 Hayward .
4,766,746 8/1988 Henderson et al. .
4,887,292 12/1989 Barrett et al. .
4,912,310 * 3/1990 Uemura et al. ...................... 235/380
4,916,443 4/1990 Barrett et al. .
4,988,987 1/1991 Barrett et al. .
5,046,084 9/1991 Barrett et al. .
5,063,764 11/1991 Amis et al. .
5,070,442 * 12/1991 Syron-Townson et al. .... 340/825.31
5,083,122 * 1/1992 Clark ............................... 340/825.32
5,097,253 3/1992 Eschbach et al. .
5,189,396 2/1993 Stobbe .
5,245,652 9/1993 Larson et al. .
5,280,518 1/1994 Danler et al. .
5,745,044 * 4/1998 Hyatt, Jr. et al. ............... 340/825.34

FOREIGN PATENT DOCUMENTS

WO 87/05069 8/1987 (WO) .
WO 89/01673 2/1989 (WO) .

* cited by examiner

*Primary Examiner*—Brian Zimmerman
*Assistant Examiner*—Yves Dalencourt
(74) *Attorney, Agent, or Firm*—Carella Byrne Bain Gilfillan Cecchi; John G. Gilfillan III; William Squire

(57) ABSTRACT

Locks for the transportation industry are programmable with a keypad and with handheld activators, the activators being programmable by a central system and activators via IR transmitters and receivers. Operator PIN numbers and access codes manifesting the supervisory level of authority are encoded in each lock which are programmed to open a given number of times in a given time period with or without entry of a code and include a lockout feature for disabling the lock in case of invalid code entry. Each lock has a log history containing the number of complete and incomplete opening transactions, when they occurred and the operator codes associated therewith. The locks are opened by IR transmission of the appropriate codes or by keypad entries. One or more individuals at different levels of authority may open one or more locks in a given time frame a given number of times. Each lock records its transaction history which is displayed and downloaded for system evaluation.

21 Claims, 17 Drawing Sheets

Lock Control Unit 6

FIG. 1
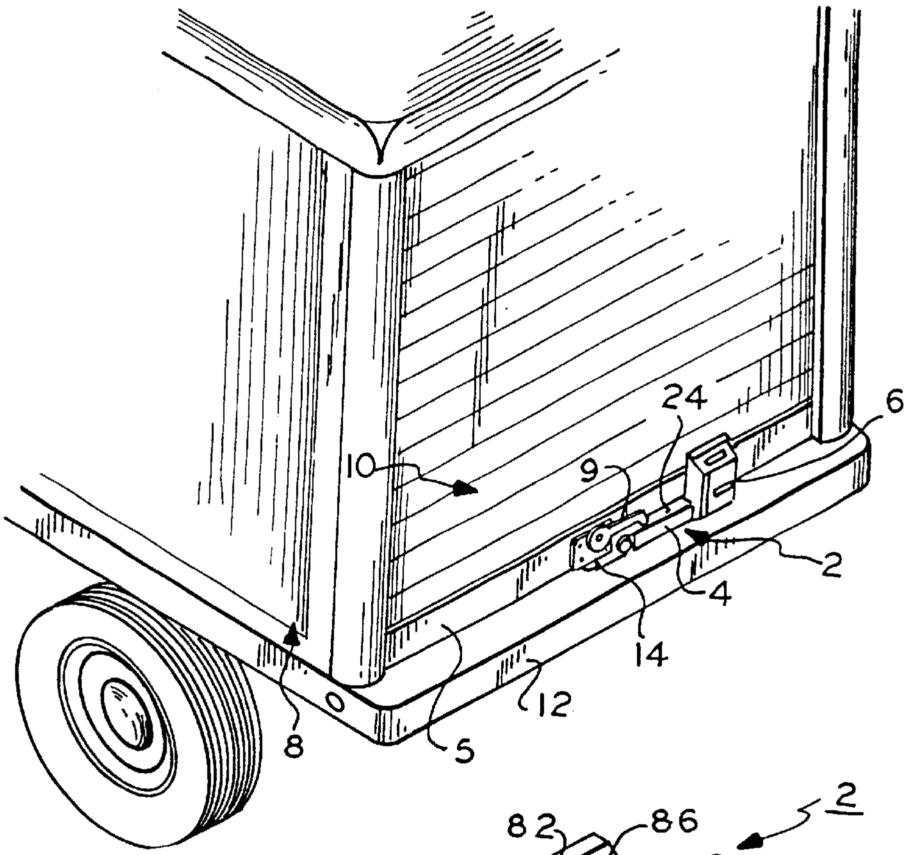
FIG. 2
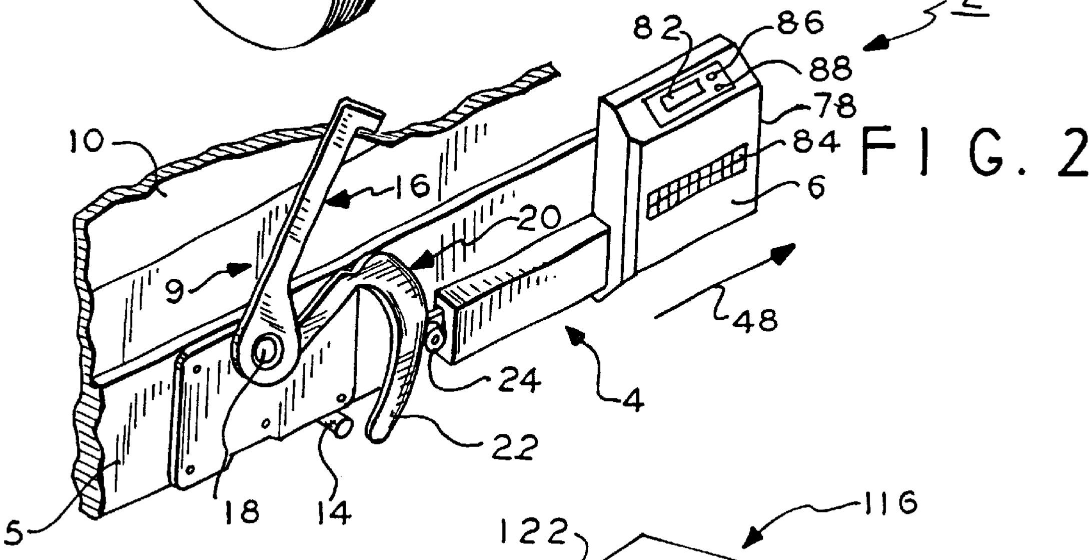
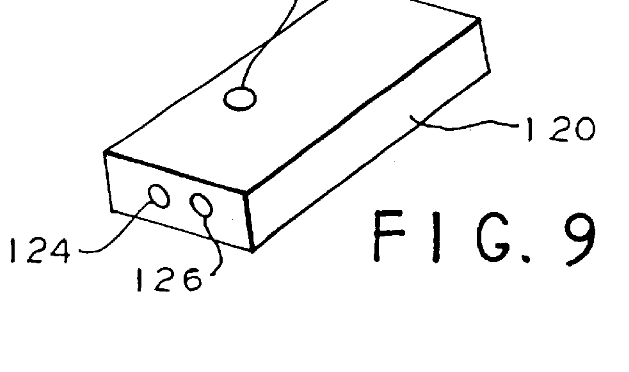
FIG. 9

FIG. 3
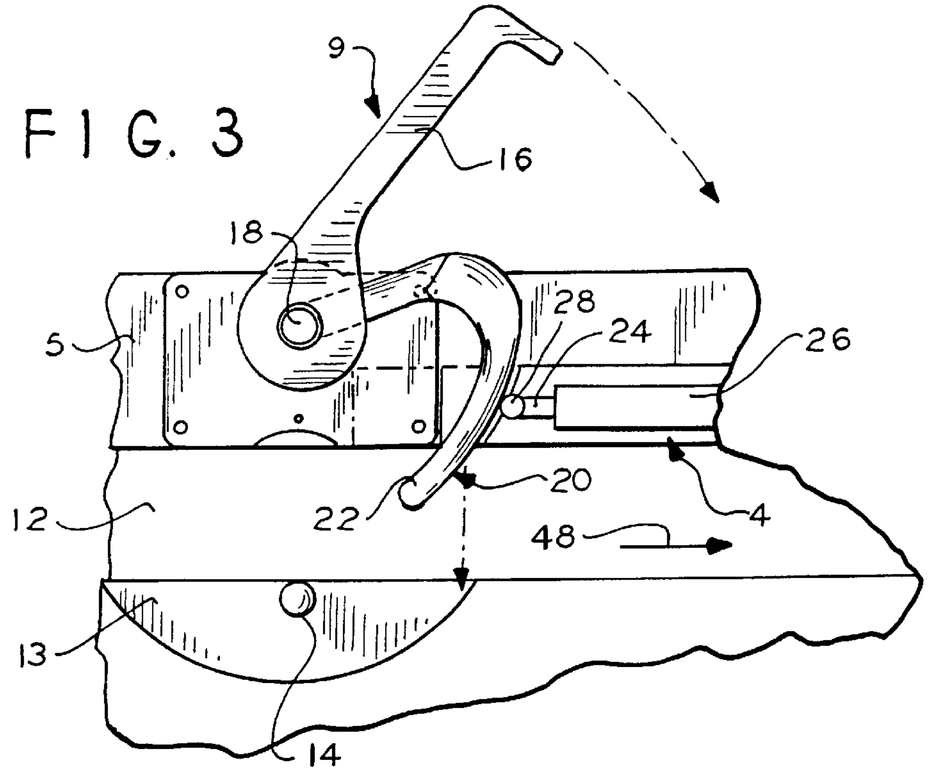
FIG. 4
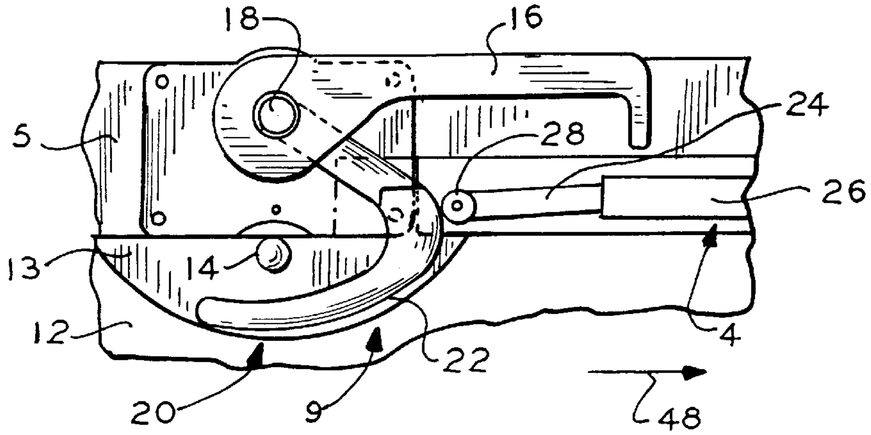
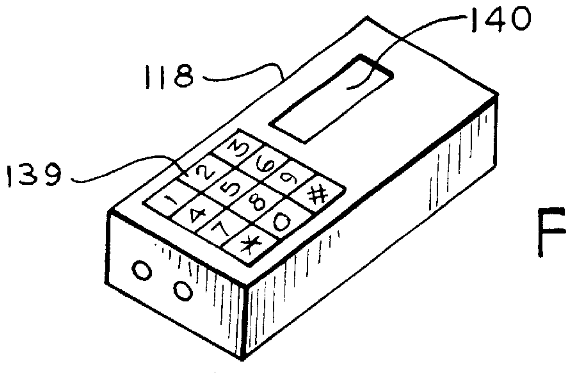
FIG. 10

Flow Chart of information transfer

Instructions
-Access Time(s)
-Access Dates(s)
-Access Code(s)
a. employee
b. supervisor
c. special
-Lock Number(s)
-Key Number(s)
-Reprogramming for Lock Log
-Record of all access
-attempts (granted or denied)
-including all instruction data
-Both lock & key share log
-"Alert" programming for unauthorized attempts Flow Chart of a Closed Ended Distribution System
(City delivery of dedicated trailers)

- In the normal course of Warehouse operations, the trucker checks in with the customers dock supervisor.

- Keys can programed for time of delivery and/or number of door openings.

- Keys can be distributed to customers preventing trailer access by the driver.

Flow Chart of a Open Ended Distribution System
(Fleet sized Line haul operations)

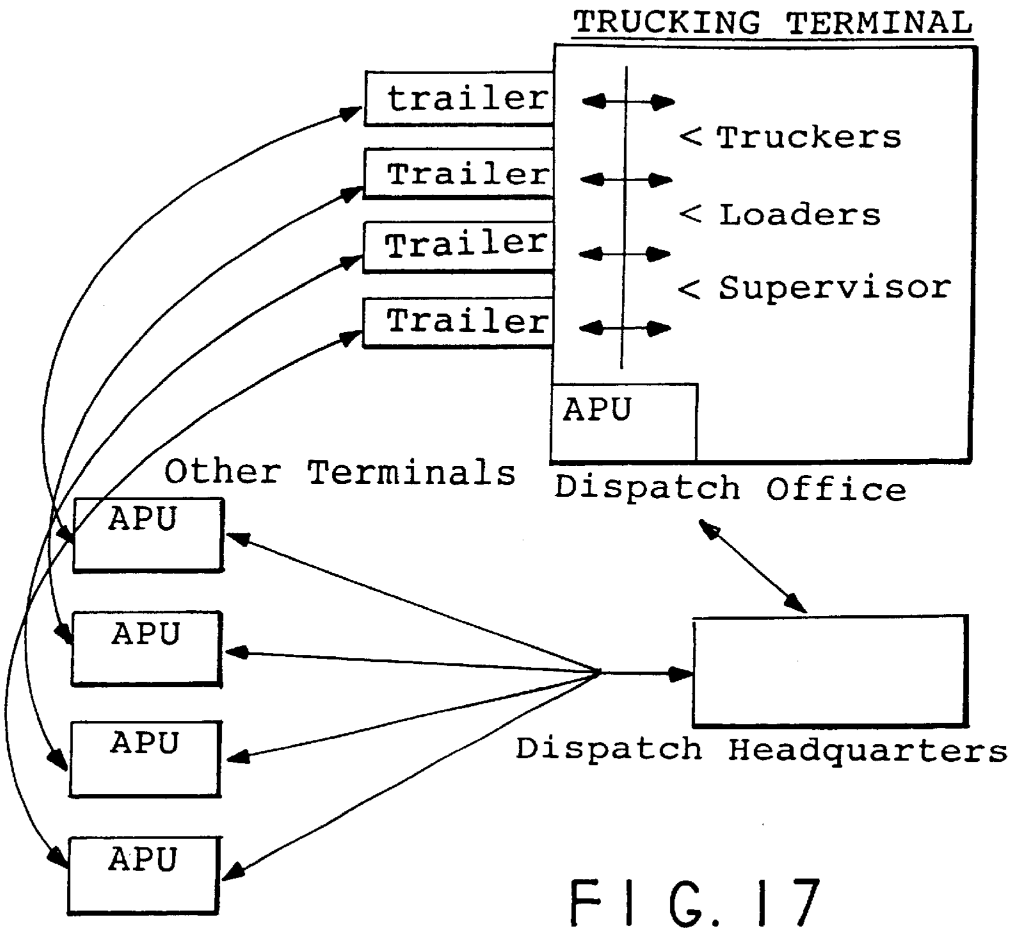

FIG. 17

- In the normal course of terminal operations, the trucker and/or loader checks into dispatch office for manifest, delivery notice, and instructions.

- Supervisors can access all trailers and harvest Log information.

- A 2 secomd key insertion will download all necessary instructions for access to trailers on a individual basis.

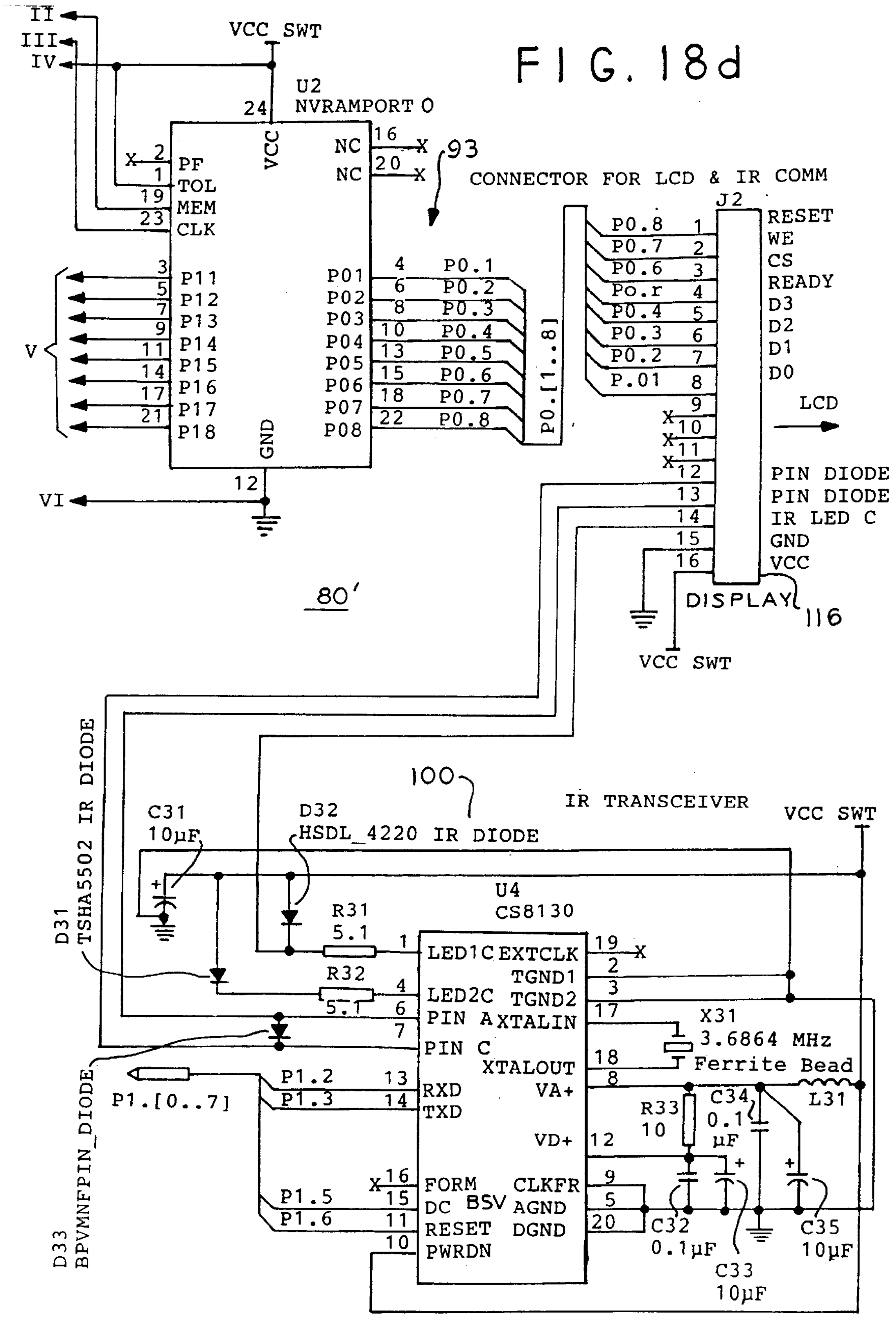

FIG. 18d
VCC SWT
II
III
IV
U2
NVRAMPORT 0
VCC
NC
NC
PF
TOL
MEM
CLK
P11
P12
P13
P14
P15
P16
P17
P18
P01
P02
P03
P04
P05
P06
P07
P08
GND
V
VI
93
CONNECTOR FOR LCD & IR COMM
J2
P0.[1..8]
RESET
WE
CS
READY
D3
D2
D1
D0
LCD
PIN DIODE
PIN DIODE
IR LED C
GND
VCC
DISPLAY
116
VCC SWT
80'
D31
TSHA5502 IR DIODE
C31
10µF
D32
HSDL_4220 IR DIODE
100
IR TRANSCEIVER
VCC SWT
U4
CS8130
R31
5.1
R32
5.1
LED1C
LED2C
PIN A
PIN C
RXD
TXD
FORM
DC
RESET
PWRDN
BSV
EXTCLK
TGND1
TGND2
XTALIN
XTALOUT
VA+
VD+
CLKFR
AGND
DGND
X31
3.6864 MHz
Ferrite Bead
L31
R33
10
C34
0.1 µF
C32
0.1µF
C33
10µF
C35
10µF
P1.[0..7]
D33
BPVMNFPIN_DIODE Central Dispatch Unit Program

PROGRAMMABLE LOCK AND SECURITY SYSTEM THEREFOR

This application is a continuation of application Ser. No. 08/982,434 filed Dec. 2, 1997 now U.S. Pat. No. 6,097,306.

This application claims the benefit of U.S. Provisional Application No. 60/032,293 filed Dec. 3, 1996.

This invention relates to programmable locks and security systems employing such locks for use by individuals or large entities employing large numbers of such locks.

Most cargo shipped by truck, rail car and so on has little or no security. For example, most truck trailers are equipped with hardware to accommodate locks, but few utilize them. Most shippers rely on seals as a means of identifying, but not preventing unauthorized entry. Seals are devices that indicate tampering, but do not preclude such tampering if one desires to break the seal.

On fleet size scale wherein some fleets comprise thousands of trailers owned and used by a single entity with numerous terminals through the country, the administrative burden of transferring and tracking keys between personnel, facilities, and trailers has proven to be insurmountable. Thus, only trailers dedicated to high risk cargo delivery in one area can be secured with any kind of substantial permanent barrier to cargo theft. Most cargo shippers look upon cargo theft as just another cost of doing business.

Consequently the present invention is directed to providing a solution to this problem. The present inventors recognizes that a security system for all levels of complexity of shipping entities requires a simplified user system that at the same time provides the necessary security at all levels required by various cargos.

A lock device according to the present invention comprises a lock including a locking member having a first lock position and a second unlock position; log means associated with the lock for electronically recording and displaying data manifesting the number of times from a reference value the locking member is placed in the unlock position; coding means associated with the lock including a personal identification (ID) code means having an ID code associated with at least one individual and access (ACC) code means having an ACC code associated with the level of authority of the at least one individual for cooperatively permitting the at least one individual to unlock the lock upon entry of the codes; and lock enable means associated with the coding means for the permitting the unlocking of the lock by the at least one individual only for a given number of times in a predetermined time period.

In one aspect, the lock includes optical transmitting means including a second personal identification (ID) code means having a second ID code associated with the at least one individual and second access (ACC) code means having a second ACC code associated with the level of authority of the at least one individual, the first and second ID and ACC code means for the permitting when the second ID and ACC codes are transmitted and entered into the lock coding means and match the first ID and ACC codes in the lock.

In a further aspect, disabling means are provided for disabling the coding means in advance of the end of a given time period for permitting the lock to be unlocked without entry of the ID and ACC codes at the end of the given time period.

In a further aspect, means are provided for disabling the disabling means.

In a further aspect, the optical means includes portable receiver means for accessing and receiving the data.

In a further aspect, the log means includes means for associating the unlocking and attempts at unlocking into the unlock position with the corresponding ID code and the time of occurrence of each the unlocking and attempt.

In a further aspect, the lock includes display means for selectively displaying the data.

In a further aspect, a portable lock operating device for unlocking at least one lock encoded with a plurality of unique codes, the at least one lock including input means responsive to the input of the unique codes for permitting the lock to be unlocked, the device comprising a portable hand held housing; and programmable circuit means including code means secured to the housing and manifesting the unique codes, the unique codes including a first code uniquely associated with a given level of authority of at least one individual and a second code uniquely associated with the at least one individual, the circuit means including means for transmitting the first and second codes to the input means for permitting the lock to be unlocked when the inputted codes match the corresponding at least one code in the lock.

A lock device according to a further aspect comprises recording means associated with the lock for electronically recording and displaying the number of times from a reference value the locking member is placed in the unlock position.

A lock device according to a further aspect comprises coding means associated with the lock including programmable personal identification (ID) code means associated with at least one individual and programmable access (ACC) code means associated with the level of authority of the at least one individual for cooperatively permitting the unlocking of the lock in response to entering of the ID and ACC codes.

A lock according to a further aspect includes code disabling means for disabling the code means in advance of the end of a given time period for permitting the lock to be unlocked without entry of the code.

A lock device according to a further aspect comprises a lock including a locking member having a first lock position and a second unlock position; data recording means for electronically recording data corresponding to the number of times from a reference value the locking member is or attempted to be placed in the unlock position; programmable coding means having at least one code for limiting access to the data to at least one individual corresponding to the one code; and programmable portable transceiver means uniquely programmably associated with the at least one individual for selectively entering the one code and for retrieving the data only upon the entering.

In a further aspect, the lock comprises data recording means for recording data manifesting the number of times the lock is unlocked and manifesting the identification of an individual associated with the unlocking of the lock; and display means for selectively displaying the data.

In a further aspect, the lock comprises display means associated with the lock for electronically recording and displaying indicia manifesting the duration and when the locking member is placed in the unlock position.

In a further aspect, the lock includes code means associated with the lock for electronically recording and displaying indicia manifesting the identification of all individuals unlocking the lock in a given period.

In a further aspect, a security system according to the present invention comprises a plurality of locks each for recording the successful and unsuccessful opening and closing thereof and the unique ID code of an individual accessing the lock; control means for programming a different unique ID code corresponding to each lock; a first programmable activator means responsive to and programmed by the control means for unlocking only a selected one of the locks corresponding to one ID code; a second programmable activator means responsive to and programmed by the control means for selectively unlocking a plurality of the locks corresponding to a plurality of different ID codes; and a third programmable activator means responsive to and programmed by the control means for selectively retrieving information from each selected lock regarding the unlocking of the at least one lock.

IN THE DRAWING

FIG. 1 is an isometric view of a lock and control unit assembly connected for locking a vehicle with a roll up door according to one embodiment of the present invention;

FIG. 2 is a more detailed isometric view of the lock assembly and truck latch of FIG. 1;

FIG. 3 is an elevation of view of the lock and latch of FIG. 2 with the lock of the assembly and latch open;

FIG. 4 is an elevation of view of the lock and latch of FIG. 2 with the latch closed and the lock locked.

FIG. 9 is an isometric view of a basic activator for use with the lock of FIG. 1;

FIG. 10 is an isometric view of an advanced activator for use with the luck of FIG. 1

FIG. 17 is a flow illustrating the flow of information is an open ended large distribution system of FIG. 11;

Figure 14:
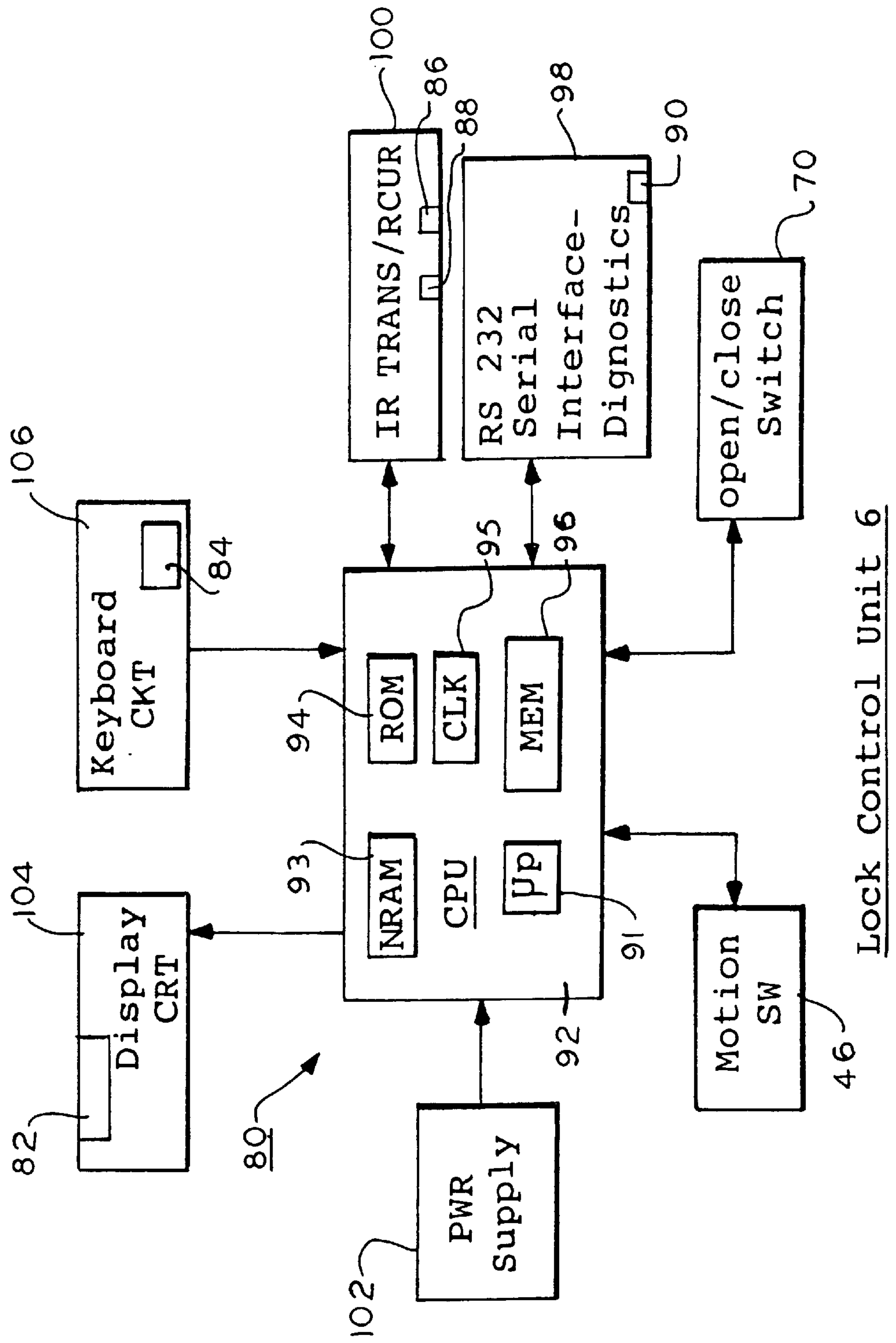
FIG. 14 is a circuit diagram for the lock and lock control unit of FIG. 1.
Figure 18A:
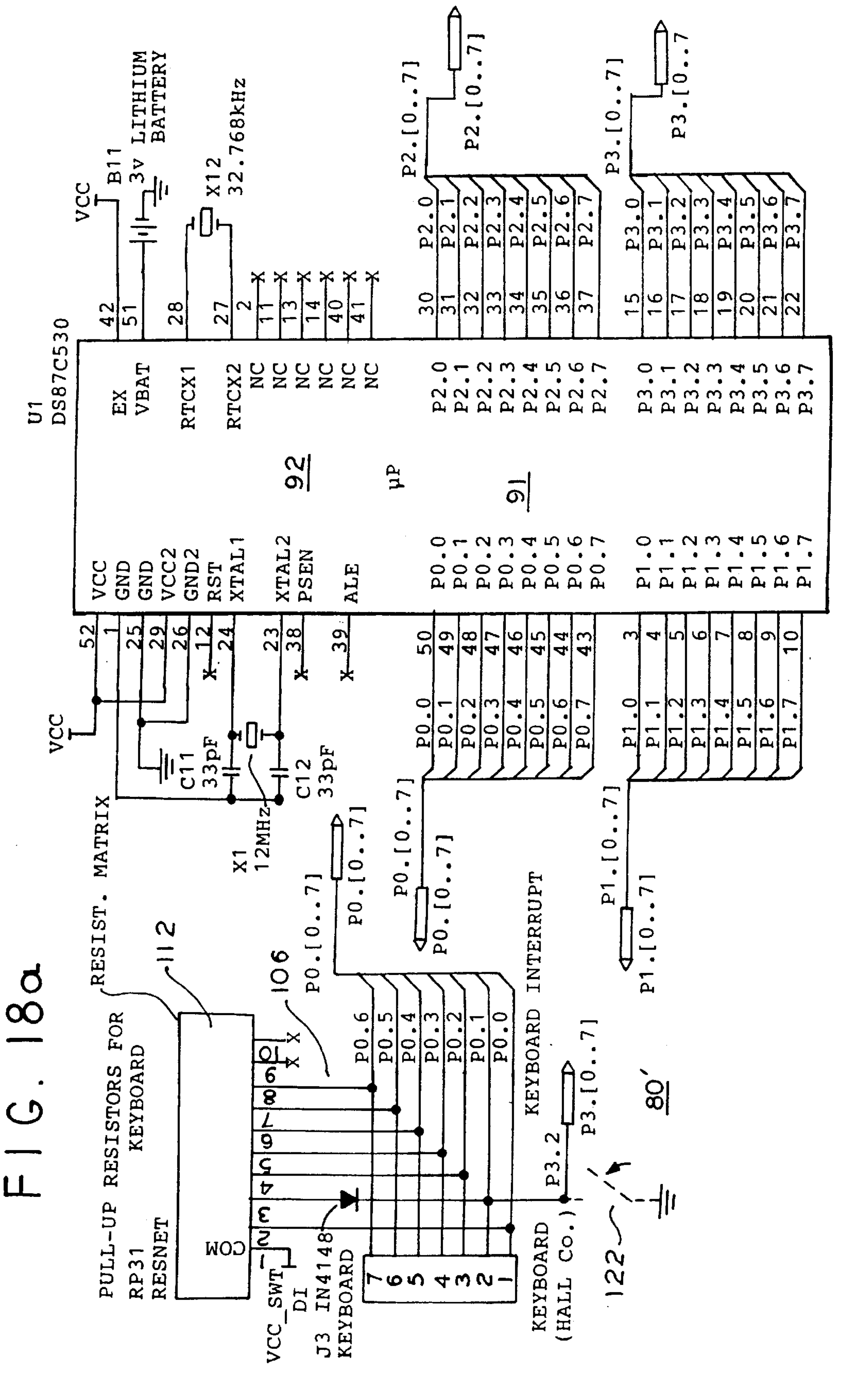
Figure 18B:
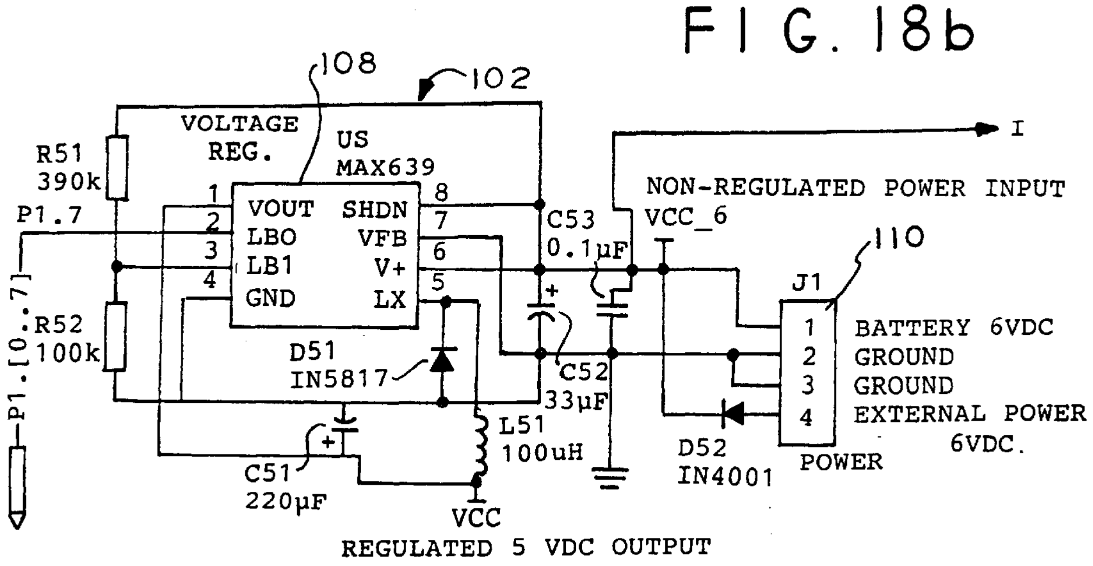
Figure 18E:
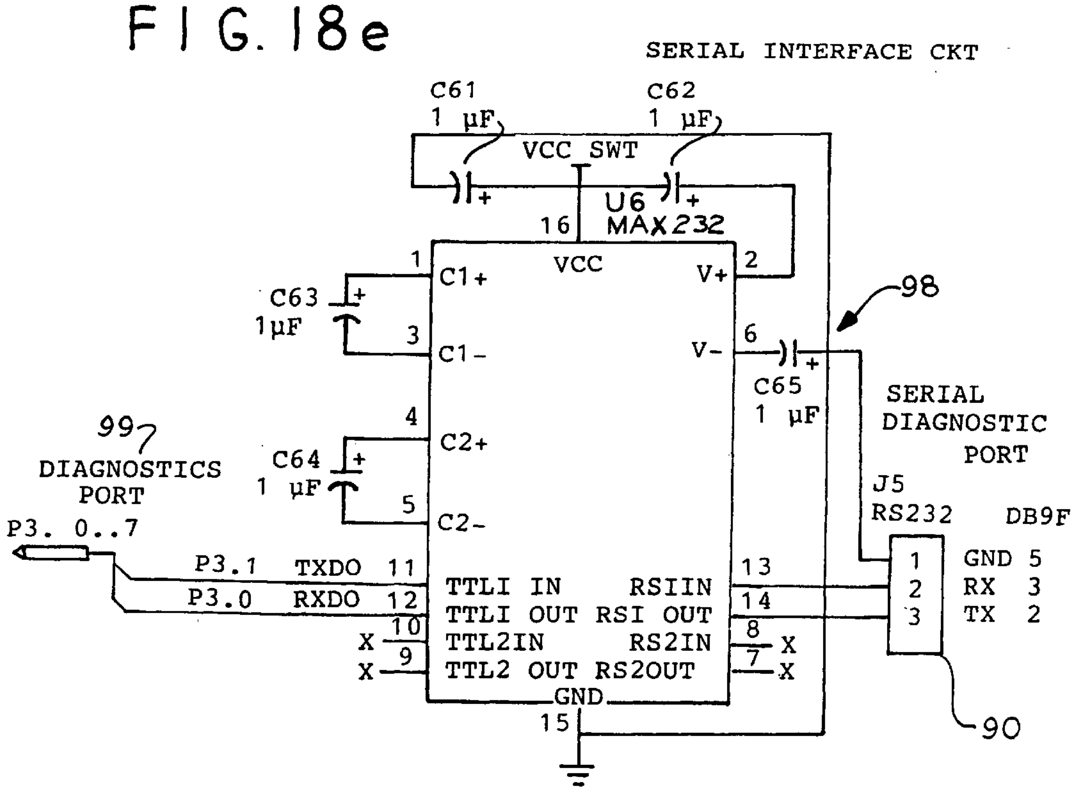
Figure 19:
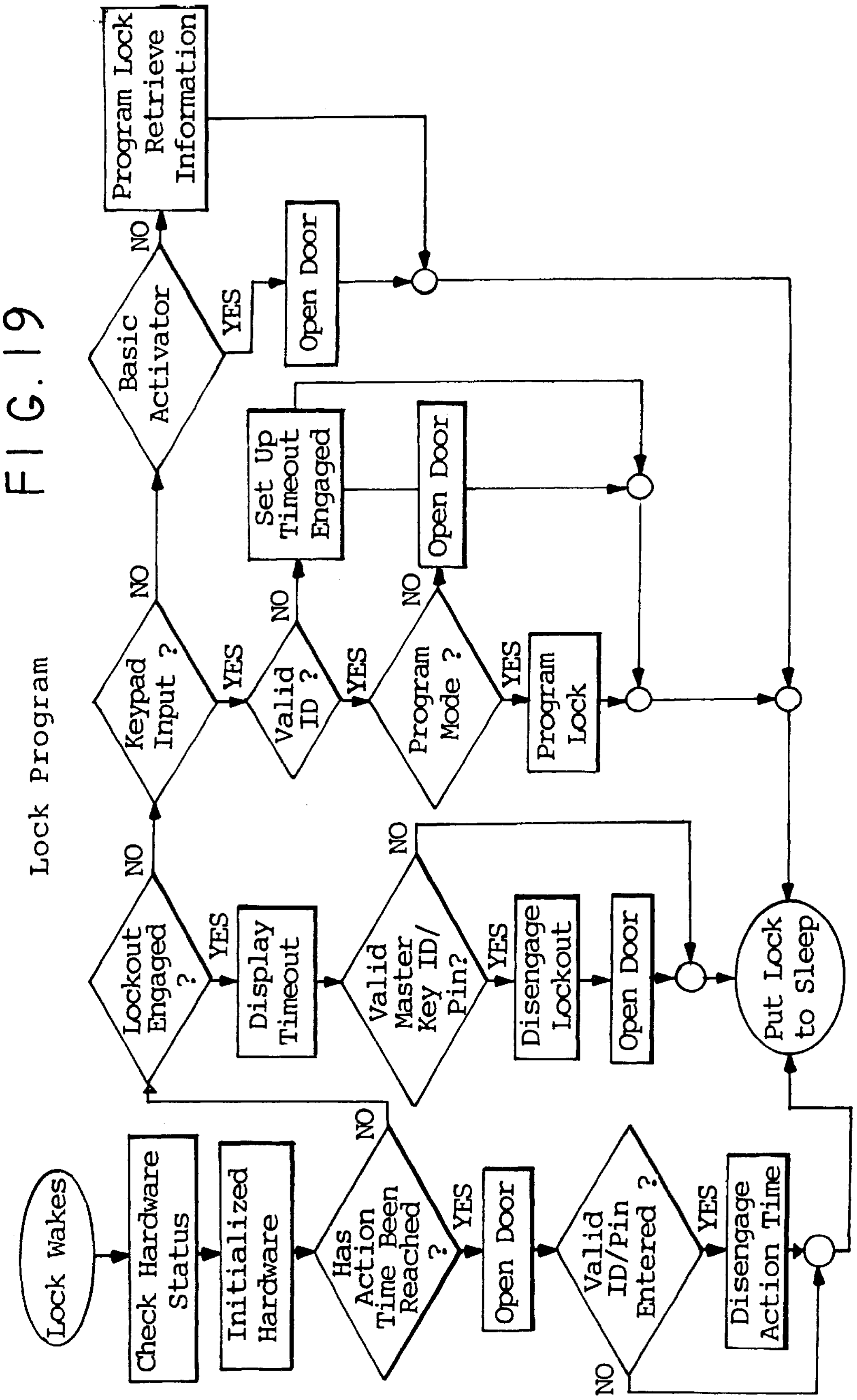
Figure 20:
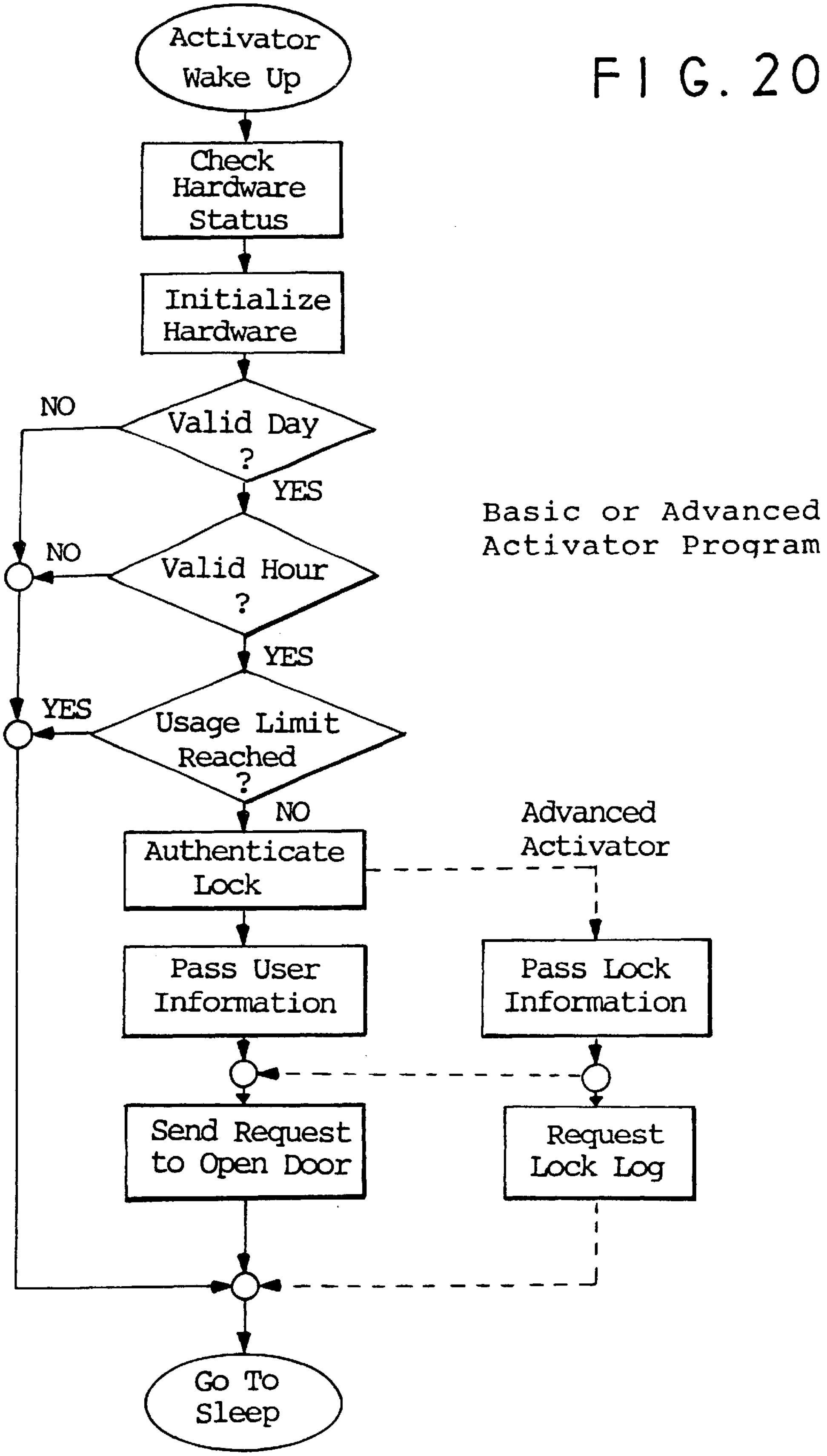
Figure 21:
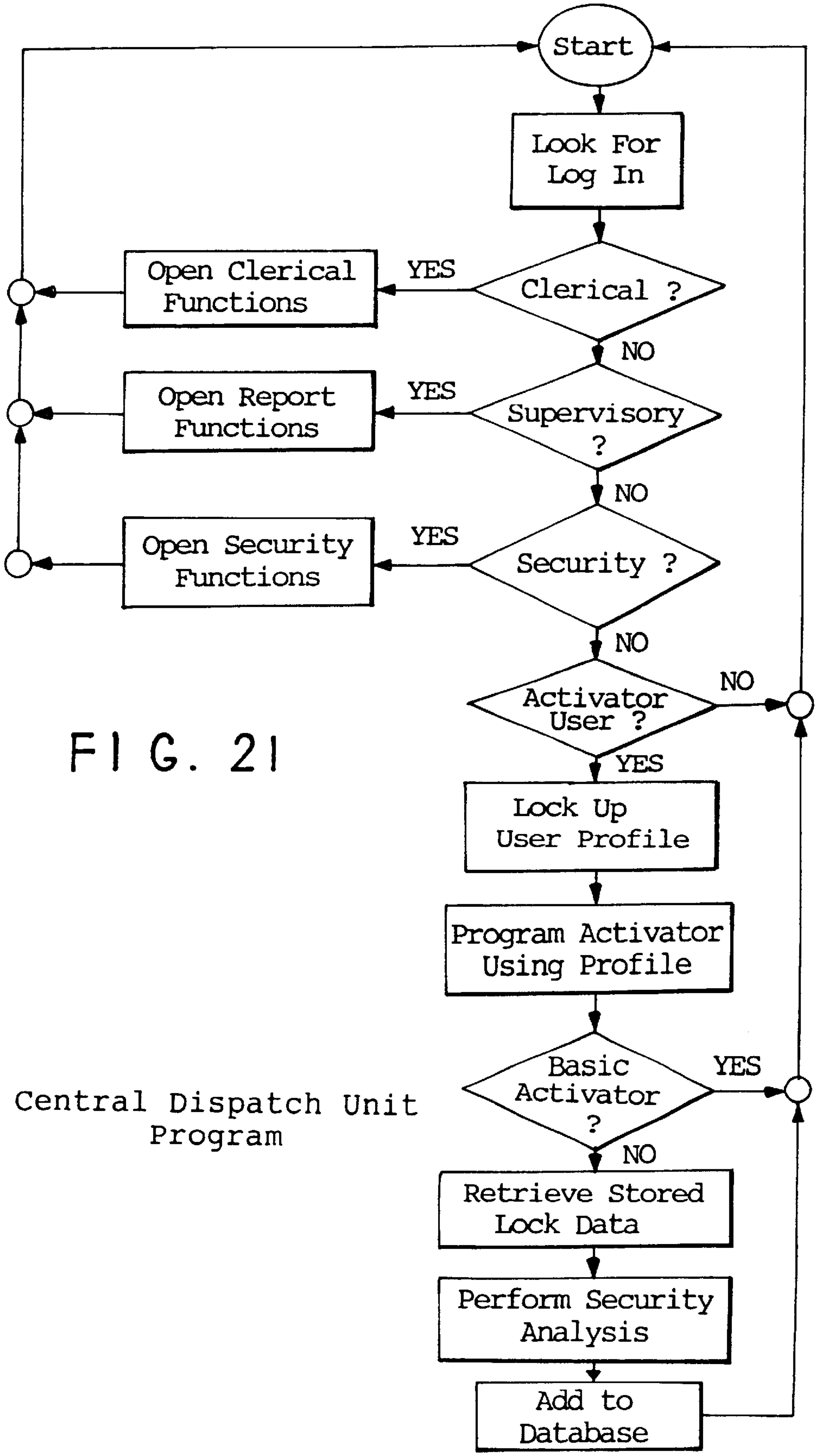

FIGS. 18*a,* 18*b,* 18*c,* 18*d,* 18*e,* 18*f* are a more detailed circuit diagram of the lock circuit of FIG. 14;

FIG. 19 is a flow chart illustrating the programming of the lock control unit;

FIG. 20 is a flow chart illustrating the programming of the basic and portion of the advanced activator; and FIG. 21 is a flow chart illustrating the programming of the central dispatch unit.

The appendix is a set of computer screens displayed by the central dispatch unit during operation of the central dispatch unit.

The Lock

In FIG. 1, lock assembly 2 comprises a dead bolt type lock 4 and a control unit 6 for operating the lock 4. These are attached to panel 5 at the rear of a truck, van or truck body 8. A roll up door 10, by way of example, is attached to the body 8. Other door arrangements may also be used in other implementations. The lock 4 is used in connection with a latch and handle assembly 9 sometimes referred to as a "J-hook" latching device and is attached to panel 5. Reference is made to U.S. Pat. No. 5,063,764, incorporated by reference herein, describing such a J-hook latching device and a dead bolt type lock therefor. That patent discloses a conventional key and combination locking mechanisms not employed in the present invention.

The latching handle assembly 9 is of conventional design and its description is provided more fully in the aforementioned '764 patent. The handle assembly 9 is mounted on panel 5. The truck body 8 includes a floor 12 having a recess 13 in which is secured latch pin 14. Assembly 9 includes a handle 16 pivotally mounted on shaft 18. The handle 16 is moved between the open position of FIG. 3 and the closed latched position of FIG. 4. A hook member 20 is rotatably secured to shaft 18. The hook member 20 has an arcuate portion 22 which passes beneath pin 14 to prevent the door 10 from moving upwardly in a locked condition. In the alternative, other latching mechanisms may be locked by lock assembly 2, such as conventional dead bolt and mating hasp type arrangements.

The lock assembly 2 is secured to the exterior surface of panel 5 laterally of the latching assembly 9. The lock assembly 2 includes an elongated plunger 24 forming a dead bolt encased in housing 26. The extended end of the plunger 24 includes a roller 28 rotatably mounted thereon at the plunger end distal the control unit 6. The roller 28 abuts the arcuate portion 22. The plunger 24 has a selectively releasable locked extended position which secures the portion 22 in a locked condition, FIG. 4. The control unit 6 is mounted on the proximal end of the lock 4.

As described, by way of example, in the aforementioned patent '764, the plunger may have two positions, an extended lock position of FIG. 4 and a retracted unlock position of FIG. 3. When the plunger 24 is in the extended lock position of FIG. 4, the roller 28 is in the pivotal path of the hook member 20 preventing movement of the handle 9 to the open position of FIG. 3. When the plunger 24 is unlocked, the plunger 24 is free to move to the right in FIGS. 3 and 4. This action permits the door 10 to be opened.

Figure 6:
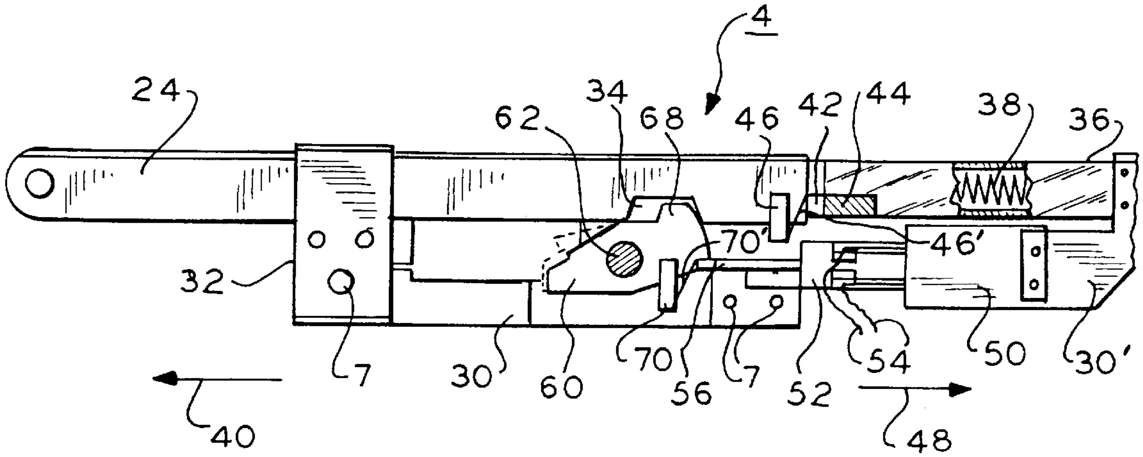
FIG. 6 is a fragmented side elevation sectional view of the lock of FIG. 1.
Figure 7:
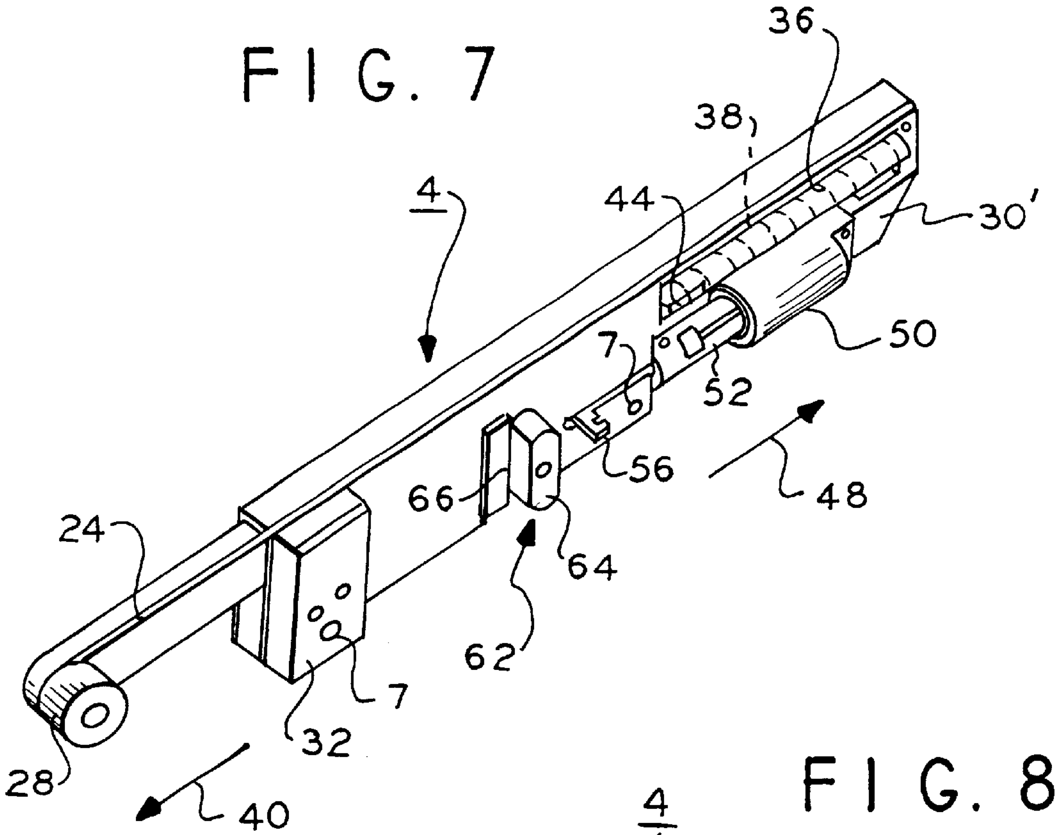
FIG. 7 is an isometric view of the lock of FIG. 6 with an intermediate cover over the lock mechanism.
Figure 8:
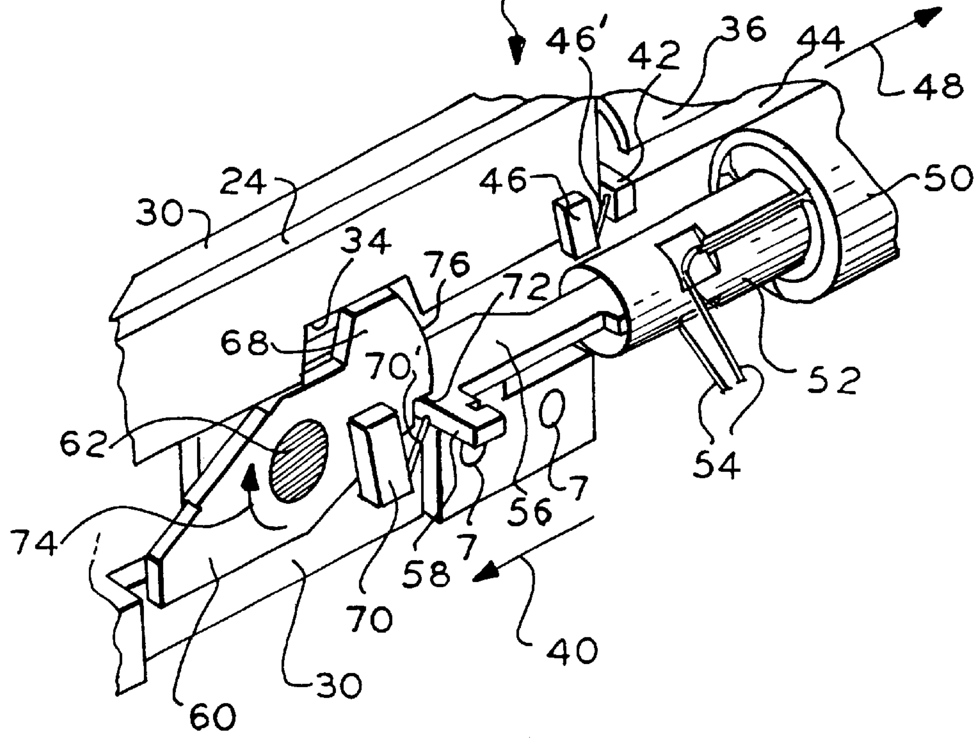
FIG. 8 is a more fragmented isometric view of a portion of the mechanism of the lock of FIG. 6.

In FIGS. 6–8, the lock 4 includes a support frame 30 to which is secured a bracket 32. The frame 30 is secured to panel 5 by bolts at apertures 7. The plunger 24 has a recess 34, the plunger being axially slidably supported by bracket 32. The plunger 24 proximal end opposite the roller 28 is supported by housing 36 secured to frame 30 at frame bracket 30'. A compression spring 38 is secured to and within housing 36. Spring 30 normally urges the plunger 24 to the lock position, direction 40.

A projection 42 is secured to plunger 24 adjacent to spring 38 at the junction therebetween and slides in slot 44 in the spring housing 36. A normally open microswitch 46, FIGS. 6 and 8, is secured in fixed position to frame 30 and has a contact 46' engaged with projection 42. In FIGS. 6, 7 and 8 the plunger 24 is extended in the locked position. The plunger 24 retracts in direction 48 when the handle 16 (FIG. 4) is displaced to open the latching of the door 10 even when the plunger is not released from the locked state. The projection 42 is moved in direction 48 by the retraction of the plunger. This movement is a fraction of an inch and occurs while the plunger 24 is locked. This initial movement of the projection 42 is sensed by switch 46 and a sense signal is generated by a microprocessor in the lock control unit 6.

The control unit 6 microprocessor generates a further signal which unlocks the plunger 24 permitting the door 10 to be opened. The lock 4 is unlocked only if the correct security information is entered into the control unit 6 by the user as described below.

Switch 46, FIG. 8, is secured to frame 30 by means not shown. The switch has a contact 46' which senses the initial movement of projection 42 and switches the switch 46 state from closed to open when projection 42 displaces. This opens a circuit (FIGS. 18*a,* 18*b* and 18*c*) in the control unit 6. The control unit 6 circuit in response generates an electrical pulse P (not shown). The projection 42 may include an adjustment screw (not shown) to adjust its gap to the microswitch 46 contact 46'.

A solenoid 50 is secured to frame 30 bracket 30'. The solenoid has a core bobbin 52 which has windings (not shown) acted upon by the magnetic field generated by the solenoid 50 when activated by power, the pulse P, applied to wires 54. This pulse P causes the solenoid 50 to pull the bobbin 52 in direction 48.

A blade 56 is secured to the bobbin 52 and displaces with the bobbin. The blade 56 has an L-shaped leg 58.

A locking latch 60 is pivotally secured to frame 30 by shaft 62 screwed to block 64 and frame 30. It is resiliently urged in a counterclockwise direction opposite direction 74 by a spring (not shown). The shaft block 64 is prevented from rotating by plate 66, FIG. 7. The latch 60 has a projection 68 which engages the plunger 24 recess 34. The recess 34 and projection 68 are dimensioned to permit the plunger to be initially displaced in direction 48 to displace the projection 42 while the plunger remains in the locked state. The latch 60 projection 68 prevents the plunger 24 from fully displacing in direction 48 precluding displacing the latch handle assembly 9 to the open position, FIG. 3.

The latch 60 has a right angle recess 72, FIG. 8. The latch 60 at the recess 72 normally abuts the blade 56 at leg 58 which prevents the latch 60 from rotating clockwise in direction 74 and disengaging the projection 68 from recess 34. This precludes displacement of the plunger 24 to the unlock position.

A second microswitch 70 is secured to frame 30. FIGS. 6 and 8. The switch 70 has a contact 70' which engages the leg 58 of the blade 56. The switch 70 is closed when the latch 60 engages leg 58 of blade 56. The switch 70 returns to its normally open state should the blade 56 be displaced in the lock opening direction 48. The control unit 6 circuit senses this switch change of state condition as a lock open condition. The switch closed state is sensed by the control unit 6 as a locked condition.

In operation of the lock 4, in FIG. 8, assuming the latch handle assembly 9 is rotated in an attempt to open it to the position of FIG. 3, the plunger 24 is displaced an amount sufficient to displace the projection 42 in direction 48. The switch 46 senses this change of position and the control unit 6 senses the change of the switch state, generating pulse P. This pulse P is applied to solenoid 50 which displaces the blade 56 in direction 48. This displacement frees the latch 60 to rotate in direction 74.

The plunger at recess 34 in response to opening the latch handle assembly 9 cams the latch projection 68 in direction 74. With the latch free to rotate in this direction, the plunger is further free to displace in direction 48, rotating the latch 60 arcuate edge 76 in abutment with the blade 56. The plunger is now free to fully displace in direction 48. The handle assembly 9, FIG. 4 is thus free to rotate to the open position of FIG. 3. In this position the switch 70 position is sensed by the control unit 4 which then notes the open state of the lock 4.

The lock plunger 24 is eventually returned to the position of FIG. 8 by relocking the handle assembly 9, FIG. 4. When this occurs, the spring 38, compressed in the open state, returns the plunger to the locking extended position. This cams the projection 68 opposite direction 74 engaging the projection 68 in plunger 24 recess 34. Switches 46 and 70 change state and the control unit 4 senses the change of state as a locked condition.

The Lock Control Unit

Figure 5:
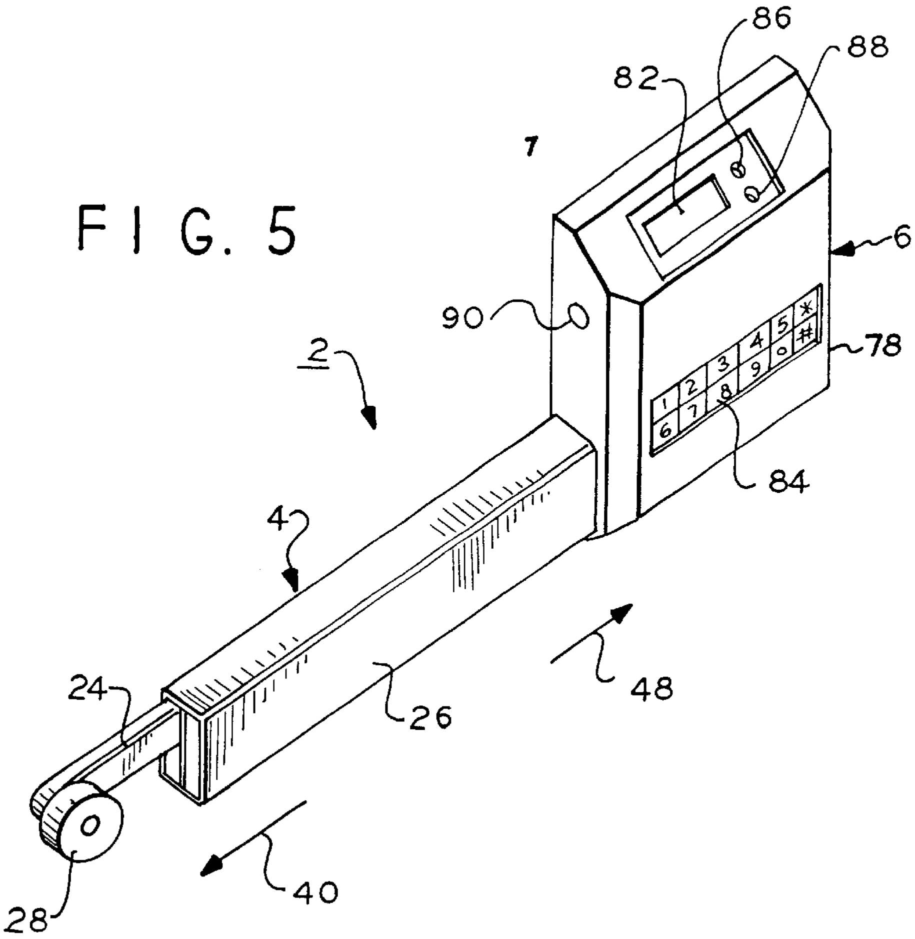
FIG. 5 is an isometric view of the lock and control unit of FIG. 1.

The lock control unit 6, FIGS. 1–5, comprises a housing 78, a circuit 80, FIG. 14, a portion of which is shown in FIGS. 18*a,* 18*b* and 18*c,* an LCD display 82, FIG. 5, a numeric keypad 84, an infrared (IR) receiver port 86, an IR transmitter port 88 and a diagnostics connector port 90. In FIGS. 18*a,b,c,* the control unit 6 also has a connector 92 which connects to a connector (not shown) in the lock 4 coupled to the solenoid 50 and switches 42 and 70 (FIG. 6).

The keypad 84 has twelve keys including the typical ten digits, a "*" key and a "#" key for manual inputting instructions to the control unit. In FIG. 14, the circuit 80 includes a central processor unit (CPU) 92 comprising a microprocessor 91, preferably a Dallas semiconductor DS87C530, ROM 93, NRAM 94, a real time settable clock 95, a RS 232 serial interface circuit 98, preferably a MAX 232, which has an internal diagnostics port 99, an IR receiver/transmitter circuit 100 for transmitting and receiving at ports 88, 86, respectively, switches 46 and 70, a battery operated power supply 102 preferably employing a lithium battery for long life (2 years), an LCD display circuit 104 for operating display 82, preferably using a Hitachi controller with two photodiodes for the IR receiver and transmitter coupled to a connector (not shown) and a circuit 106 for operating keypad 84.

In FIG. 18*a* the power supply 102 includes a voltage regulator 108 and a battery input connector 110 (the battery not being shown). Resistor matrix 112 is coupled to connector 114 for connection to the keypad 84 (FIG. 5). In FIG. 18*d,* connector 116 is connected to the Hitachi LCD display board (not shown), to the IR transceiver circuit 100 and to NRAM 93.

The NRAM 93 records log information regarding door 10 opening and closing including dates, times, Ids (identification of individuals using the lock), and other information as described below.

Operation of The Lock Control Unit 4

Keypad 84 operations include:

Activate the locking control unit 6 with the "*" key.

Unlock lock with proper PIN (personal identification number assigned to individual operating the unit 6).

Display lock log with specific access code.

Change clock with specific access code.

Disengage Auto-open Mode with specific access code.

Programming options (Table III) for the master PIN-access code combination. (The above to be explained below.)

These operations are tied to specific access codes so that personnel can be dedicated to particular tasks without allowing them to perform other locking control unit 6 functions. The master PIN-access code combination allows the operation of the lock assembly control units 6 to be changed in a number of ways as set forth in Table I by depressing the keys of keypad 84. The particular modes of the table will be explained in more detail following the table.

TABLE I

| Key No. Keypad 84 | Description |
|---|---|
| 0 | Display lock log on keypad |
| 1 | Set date and time of real-time clock |
| 2 | Change PIN-access code combinations |
| 3 | Set time for Auto-Open Mode to engage |
| 4 | Toggle access stamp behavior |
| 5 | Perform lock control unit 6 diagnostics |
| 6 | Change keypad access parameters |
| 7 | Change communication encryption keys |
| 8 | Disengage Auto-Open Mode |
| 9 | Change verification key |
| * | Open the lock control unit 6 |
| # | Toggle the lock log display period |

A number of the locking unit 6 functions are duplicated for the master user. A master user is one who has overall authority such as a supervisor at a dock location of a distribution center. There may be only one such person with such authority at a given location and time period. This is to cover the case when dedicated individuals are not available to carry out those operations. There are also a number of dedicated functions that are only available to the master user for security reasons.

The following are specific functions outlined above.

Activate the Lock Control Unit 6

The necessary steps to activate the lock control unit 6 are given in Table II below.

Table II

1. Press star '*' key on the keypad 84 to activate the lock control unit. This wakes up the CPU 92, FIG. 14. A lock control unit buzzer (not shown in the Figs.) will sound and a 7 digit serial number unique to that lock assembly will be displayed on the LCD 82. If the lock assembly 2 has never been opened previously, this number will be 0000. Otherwise, it will have a value that should be recorded in the same fashion as the serial or identification number of a physical seal of the prior art.
2. The display 82 will show ACC and the operator must enter his assigned access code. As a security measure, a dash will be displayed every time a key is pushed. To finish the access code entry, the pound sign (#) is depressed on the key pad 84. The operator has five seconds to complete the entry of the access code or the lock control unit 6 will deactivate itself.
3. The display will show the PIN as a reminder, and the operator will have five seconds to enter his PIN number. There will be a dash displayed for every digit pressed and the PIN entry is also terminated by pressing the pound (#) key on the keypad 84.

The lock will check the access code/PIN combination stored in memory and verifies that the combination has permission to open the lock. At that point, the unlocking operation can be carried out as outlined below.

Opening the Truck Door 10

In order to open the door 10, the following steps must be taken,

1. Activate the lock control unit 6 as described above,
2. When PUSH shows on the display, move the handle 16, FIG. 2, at a brisk pace to disengage pin 14. The display will show U_LOC.
3. When finished, close the door and return the handle to its original locked position. The display will show LOC, and a few seconds later will display a number. That number should be written down where the serial number of a physical seal would be recorded.

Other Lock Control Unit 6 Functions

Other lock control unit 6 functions available from the keypad 84 require that the lock control unit be placed into a programming mode. To do this:

1. The star '*' key is depressed to activate the lock control unit 6 as described above.
2. The star '*' key is depressed a second time to activate the programming mode. Both PROG and ACC will appear on the display.
3. The operator enters his access code and a dash will appear every time a key is pushed. To finish the access code entry, the pound sign (#) is pressed. The operator has five seconds to complete the entry of the access code or the lock control unit will deactivate itself.
4. PIN will be displayed as a reminder, and the operator will have five seconds to enter his PIN number. There will be a dash displayed for every digit pressed and PIN entry is also terminated by pressing the pound (#) key on the keypad.

The lock will check the access code/PIN combination and verifies that the combination has a valid programming permission setting. Lock control unit programming permissions include:

display the lock log data, change the lock control unit real time clock, stop automatic lock opening, or master programming mode.

The first three permissions are available so that a large operation has the option of dedicating individuals to specific maintenance functions without giving them more authority than they need to get the job done. For example, there could be an individual that periodically verifies that all the real time clocks of different lock control units 6 at a facility agree with a particular standard, or collects the lock control unit history for each unit 6, for security or archival purposes in a manner to be described.

The ability to stop automatic lock opening (to be described below—which is an operation whereby the lock control unit 6 is programmed to automatically open on a given day at a given time) can be useful for drop and carry operations where a driver drops off a trailer and the receiving person can open the lock by depressing a key without entering a code into the unit 6. This automatic feature can be provided to the receiving person without compromising the integrity or other security functions of the lock control unit 6. All three of these functions are also available in the master programming mode for trucking operations that are too small to dedicate specific individuals to specific functions. The master programming mode also includes a number of other lock control unit functions that will be discussed below.

Master Programming Mode

The master programming mode is a high level security operational mode for the operating the lock control unit 6 from the keypad 84. It permits relatively few authorized personnel to change the operational characteristics of the lock control unit 6 as well as handle standard maintenance operations. Once the lock control unit 6 has accepted the master programming mode permission, the user must enter one of the keypad numbers in Table III to select a particular option.

TABLE III

| Num | Function |
|---|---|
| 0 | Display the lock log |
| 1 | Change the lock control unit real time clock |
| 2 | Change the lock control unit access-code/PIN combinations |
| 3 | Set lock control unit automatic opening time |
| 4 | Change method for calculating access stamp |
| 5 | Run lock control unit internal diagnostics |
| 6 | Change manual keypad security entry parameters |
| 7 | Change the lock control unit encryption key |
| 8 | Disable automatic opening mode |
| 9 | Change the verification key |
| * | open the lock control unit |
| # | Toggle the lock log display period |

Display Lock Log via Keypad

Assume the lock unit 6 has been activated in programming mode. The access-code/PIN combination is directly selected in this function, or has been selected as option 'O' in the master programming mode.

The unit will display the total number of openings followed by a number corresponding to the last record. The total number of openings forms a lock serial number which changes after each opening. This lock serial number is useful for associating an operator with that lock. This serial number is thus sequentially reset for each opening of the lock. The lock log history records the number of openings for a given lock, and thus it is easily determined if a given lock with a preassigned serial number is the same lock based on the additional openings recorded by that lock in its log records. The new serial number is the original serial number plus the additional openings recorded by that lock.

If the operator does not press any key, the log data for the last opening of the lock will be displayed.

The lock log records will be displayed backwards in time. The default state is to quit after the last 24 hours have been covered. This can be changed by a toggle.

At any time, the display of the next record can be aborted by hitting any key.

Enough information is displayed to be useful, but not excessive such that it causes a significant battery drain. This log information includes user ID and lock serial number as well as the times and dates that user has opened and closed the lock. This information can be downloaded into a log report via the IR transmitter 88.

Set Date and Time of Real-time Clock

At the time of manufacture, the real-time clock will not be set at the correct time and date. Therefore, one of the first operations is to set the lock control unit 6 real time clock to the correct time and date.

The system software design allows tracking of times within a thirty year range. After 30 years, the space allocated for holding times will not be sufficient and erroneous dates will appear in the lock log. A new lock control unit 6 is required or the lock logs are corrected for the time storage overflow in which the unit resets itself to a new erroneous start date.

The clocks can drift over time, so it may be necessary to adjust the time periodically to keep all the lock control units 6 within a desired tolerance.

Preferably, all lock control units should be set to one standard time base. In the case of a local operation, use of the local time would be sufficient. However, for operations which span several time zones, all locks should be set using a common time base, such as Greenwich Mean Time. Since all control units 6 have real time clocks, this type of synchronization will minimize problems and misunderstandings at different locations of a large trucking entity. The locking control unit 6 does not know which time zone it is in, or correct for such zones.

Assuming that the lock control unit 6 has been activated in the programming mode and that either the access-code/PIN has selected this option automatically or it has been selected manually from the master programming options as option 1, the clock is then reset by a clock setting protocol.

1. The unit will initially display the complete date, day, month, and year and then the unit will display the year.
2. The date is set by successively setting the year (two digits), month (two digits) and day (two digits) followed by the pound (#) key after each setting.
3. The unit will display the complete time, hour, minute, and seconds which are then changed in similar fashion.

Between each entry, the operator has approximately five seconds to type in the two digits, otherwise the unit will deactivate. A check is incorporated into the data entry routines to verify that a correct value has been entered for each data entry. Otherwise, the attempt to change the real time clock will fail and the lock control unit will deactivate.

Change PIN-Access Code Combinations

The lock control unit normally is shipped from the factory with a default set of access codes, Table V. These codes would also be in place should the non-volatile RAM fail for some particular reason. It would be a serious security breach to leave the default access codes in the lock control unit, since they would be known to everyone that purchased a lock control unit.

This option can be used to change and/or augment the access-code/PIN combinations to the limit of the lock control unit. The special access-code/PIN combinations are given in a particular order and will keep their special position. The normal access-code/PIN combinations can be kept in any order.

This function is only available to someone with a master programming mode permission.

1. The control unit 6 will display the first code that can be reprogrammed. That code is used to display the log data for the records of openings.
2. The operator can enter a new code for up to 7 digits followed by the pound key. If a mistake is made in entering the new code, the star key will reset the unit to start over with the new code.
3. If the operator chooses not to change the old code, the star key or pound key can be pushed to display the next code that can be re-programmed.
4. The second code will be used to program the clock. It can be changed in the same fashion.
5. The third code is the master programming code. It can also be changed in the same fashion. The new codes should be recorded.
6. The fourth code is the code to disengage the automatic opening of the lock when it has been placed in auto-open mode. It can be changed in the same fashion.
7. The next three access codes are special override access codes. They should be relatively long to prevent guessing and should also be recorded after being changed.
8. All of the access codes mentioned above will work with any PIN number. Therefore, the locking control unit will not ask for a PIN entry in changing these codes. All that follows is for general access codes and PIN numbers for opening the lock. They can be changed in a similar fashion as above, but both the access code and the PIN must be provided when prompted.

Set Time for Auto-Open Mods to Engage

For some operations, such as drop and carry, it is necessary to be able to program the lock control unit 6 to automatically open after some fixed time without requiring the usual PIN-access code information. When the keypad is activated, the lock control unit 6 will automatically unlock the lock 4.

This function is available for programming by one with a master programming mode permission. It is selected as an option and requires setting a future time. After that time, activating the keypad will automatically start the unlocking sequence without requiring an access-code/PIN combination.

1. The unit will display the entire date, day, month and year.
2. The unit will display the year, month and day in order. These are changed with a two digit entry followed by the pound key.
8. The unit will display the entire time, hour, minute and second which is changed in similar fashion.

Between each entry, the operator has approximately five seconds to type in the two digits required, otherwise the unit will deactivate. The data entry routines are verified as to the correct value for each data entry. Otherwise, the attempt to set a time for automatic opening will fail.

When the lock control unit is activated, if the current time is past the programmed time, then lock will automatically begin unlocking operations. The programmed time should be relative to the time base selected, such as local time or GMT.

Toggle Access Stamp Behavior

The access stamp, which is like the serial number on physical seals, can be generated in two different modes. In the first mode, the access stamp takes on sequential values. This makes it easier to determine if there has been an additional opening of the lock control unit beyond the planned number, but since it is easy to guess the value, there is a security risk associated with corrupt personnel.

For additional security, the access stamp can be generated from the lowest order bits of the real time clock. Since the real time clock is running rather fast, it is difficult to predict before the fact exactly when the lock will be opened. This makes the access stamp difficult to predict before the fact. However, it is difficult to determine just by inspection if the lock has been opened more often than planned. It would be necessary to inspect the lock log stored in memory for each locking control unit 6 for that information.

The access stamp function is only available in master programming mode, and it is only a toggle. Select once and it changes the method for calculating the access stamp. Select again and it returns to the original method.

Perform Lock Control Unit Diagnostics

The lock control unit contains a microprocessor, memory, and batteries and other internal components. Choosing this option will attempt to test as many of these components as possible without changing the operation of the lock. It is only available as an option in the master programming mode and should be used to determine if the lock control unit is in need of servicing.

This option puts the lock control unit immediately to sleep.

Change Keypad Access Parameters

In manual operation of the keypad, it is necessary to be more forgiving than with an activator 116 or 118 (FIGS. 9–11) (an IR operating communication remote control unit for communicating with the lock control unit 6 via IR signals emitted by the activator 116 or 118 and control unit 6 in place of use of the keypad 84) to be described below. There are three parameters that can be set, the number of invalid opening attempts, the elapsed period of time for invalid opening attempts the length of time the keypad will be locked out.

The parameters are set at default values at the time of manufacture, but can be changed from master programming mode by selecting the option. The procedure is outlined below.

1. Show current number of invalid opening attempts
2. Get new number of invalid opening attempts less than 256
3. Show the current number of seconds to produce a valid login
4. Get new number of seconds to produce a valid login less than 1 hour
5. Show current number of seconds to lock out keypad
6. Get new number of seconds to lock out keypad less than 12 hours (keypad lockout means the keypad is disabled and cannot be used until reenabled after a preset programmed elapsed time period, the lockout occurring in response to entering of invalid login, for example).

If the security lock out feature has been activated in a lock control unit, instead of showing FAIL on the display, it will show TIMEOUT on any attempt access code-PIN combination except for the special access codes, the keypad, terminal, and master codes. These codes will automatically unlock the unit and disable the security lock-out function. Otherwise, it will be necessary to wait until the lock out period has passed (the time prior to the time set for the lock to be opened in the program of the lock control unit 6), and then all the codes will work as usual.

Change Communication Encryption Keys

Each lock control unit 6 contains an eight character encryption key that is used in communicating with activators to be described. This eight character encryption key should be changed from the factory default and set to a user standard to prevent "foreign" activators from manipulating lock control units. Changing this key is limited to the master programming mode for security reasons.

It requires repeating the following procedure 8 times:

1. the display will show a number between 0 and 255 inclusive
2. enter a new number between 0 and 255
3. press the pound key to move to the next encryption character Disengaging Auto-Open Mode A truck or trailer could be dropped at a location for an extended period of time for loading. The lock control unit 6 can be programmed to automatically open upon pressing the (*) key on the keypad without supplying an access code/PIN combination. This is called the Auto-Open Mode.

Each lock also has an Access code/PIN combination that will halt the Auto-Open Mode, requiring a valid access code/PIN combination to open the door again. This is for the customer to close and lock the lock assembly 2 while waiting for a locked trailer to be picked up.

Press keypad key "*", the display will show PUSH

Wait for approximately five seconds and the display will change to show PROG and ACC Enter the special access code/PIN combination in the usual fashion If done correctly, the Auto-Open mode will be disengaged and it will require a valid access code/PIN combination to open the lock.

This procedure is to be used after the Auto-Open Mode has been engaged. It is required because the lock is already in the opening process as soon as it is activated. The Auto-Open Mode can be aborted after programming but before engagement by using the option from the master programming mode.

Change Verification Key

The verification key is another encryption key that is used to help secure communications between the lock control unit and the activator. There is also a factory set default code that should be changed to a user standard as soon as practical. The keypad procedure is much the same as for the encryption key and for the same reason is limited strictly to the master programming mode.

Repeat four times, 1. the display will show a three digit number between 0 and 255 inclusive
2. enter a new three digit number between 0 and 255 inclusive
3. press the pound key to finish entry of the character.

Hardware Error Codes

The two microswitches 46 and 70 in the lock control unit 6 determine the state of the mechanism. One, motion switch 46, determines if the plunger 24 is initially being displaced, indicating that the lock is being opened. The second, open/close switch 70, senses if the plunger 24 has moved enough for the lock to be opened.

The switches 46 and 70 can exhibit inconsistent states for a number of reasons. A low level code checks for these conditions and produces the following error messages, Table IV, on the display 82. The code Error 0 is self explanatory and is not concerned with the state of these switches. Error 0 relates to when the lock control unit switches to default settings from prior code settings in case of power failure, for example.

TABLE IV

| Display | Explanation |
|---|---|
| ERROR 0 | Lock control unit is at default settings |
| ERROR 1 | Open/Close switch is open when trying to open the door |
| ERROR 2 | Motion switch is open when trying to open the door |
| ERROR 3 | Door is open but the motion switch is closed |

Generally freeing the plunger 24 of the lock assembly 2 and attempting to open the lock again will clear the error condition. If it continues, the lock control unit needs to be checked mechanically.

Factory Default Codes

The following Table V illustrates access code/PIN pairs with their associated permissions programmed into the lock control unit at the factory. The designation ANY_PIN means that the system will still require entry of a PIN number for the lock, but it will not prevent the operation from taking place regardless of the value given. The PIN is used only for recording purposes.

It is possible for several people to use the same master access code by giving them different PIN numbers for identification. The system will record the PIN given, but will not be able to verify its accuracy.

The first set of records are dedicated to a variety of special functions. The access code can be changed, but the use of any PIN number can not be changed. Master lock programming mode allows for changing and examining the internal state of the lock. The next three codes allow for the concept of "master keying". Even if the lock control unit is in a security time-out, these codes can still open the lock and disengage the security lock-out. The remaining codes are normal permissions for opening the lock. They can be edited, added, or deleted from the lock using the keypad in the master lock programming mode.

Table V

| Access Code | PIN | Permission |
|---|---|---|
| ABCVDRT | ANY_PIN | Dump the lock log |
| BVSTREE | ANY_PIN | Set the lock clock |
| ABCDEFG | ANY_PIN | Master lock programming |
| DFGHJKL | ANY_PIN | Disengage Auto-Open Mode |
| QWERTSD | ANY_PIN | Keypad code |
| DSAEWQR | ANY_PIN | Terminal code |
| DFGVCXZ | ABC | Master code |
| AZSXDCF | XYZ | Open lock |
| FBVNMHJ | DSA | Open lock |
| UIOPLKL | | Open lock |
| ZXCVBNM | | Open lock |

The Activators

The Basic Activator

Figure 11:
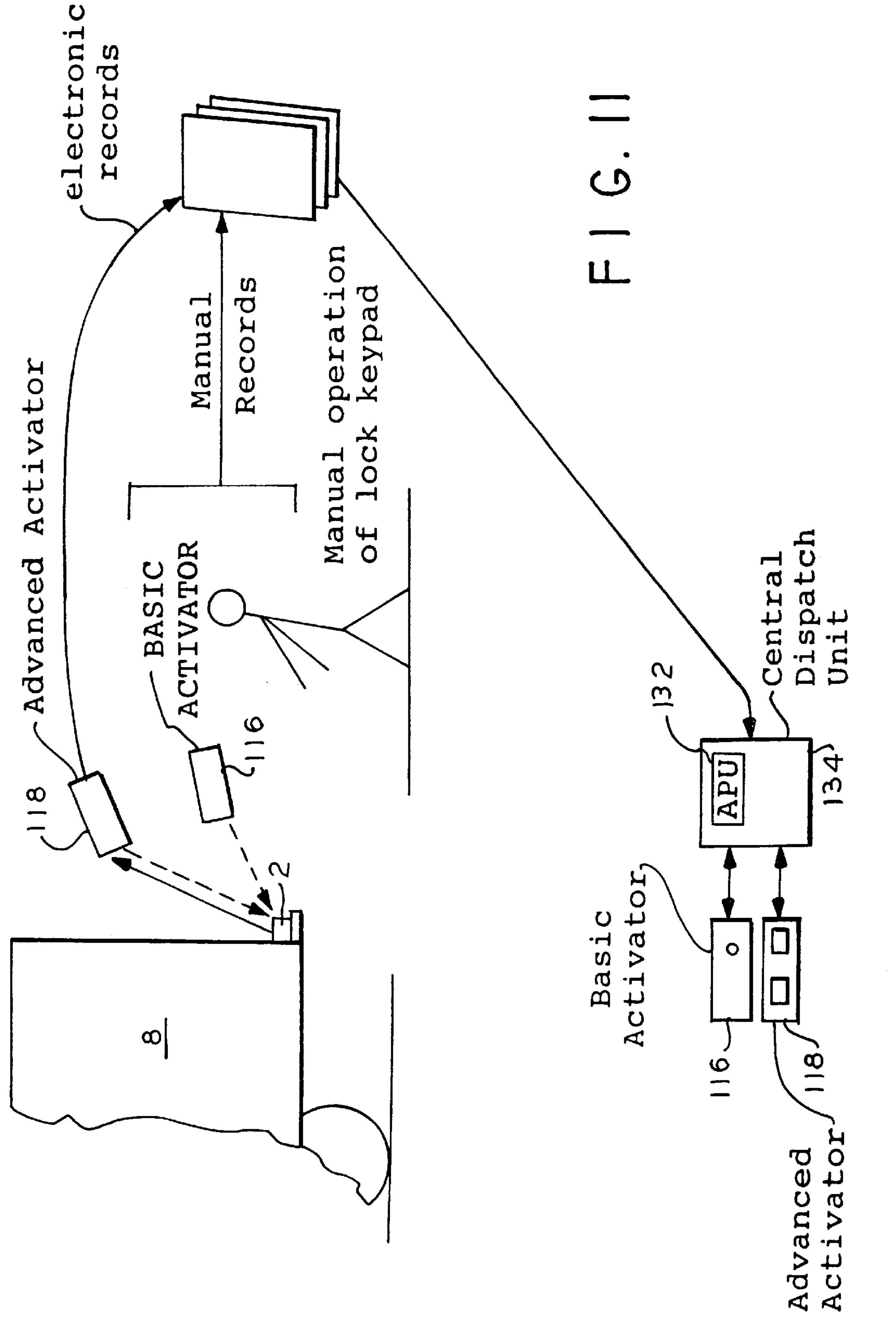
FIG. 11 is a diagrammatic view of a central dispatch unit and system incorporating the lock and control of FIG. 1 with the activators of FIGS. 9 and 10.

In FIGS. 9 and 11, a basic activator 116 comprises a housing 120, a switch 122 and IR transmitter 124 and IR receiver 126. The basic activator, FIG. 13, includes a CPU 128 including RAM, ROM, a microprocessor and a real time clock. These elements are substantially the same as the corresponding elements shown in FIGS. 18*a, b* and *c* for the lock control unit 6. The difference is the memory is smaller in the basic unit, e.g., 2 k as compared to 16 k in the lock control unit 6 and there is no display or keypad. In addition in FIG. 18*a*, there is no keypad circuits 106, 112 and 114. These elements are replaced by a simple on-off switch 122, shown in phantom.

Figure 13:
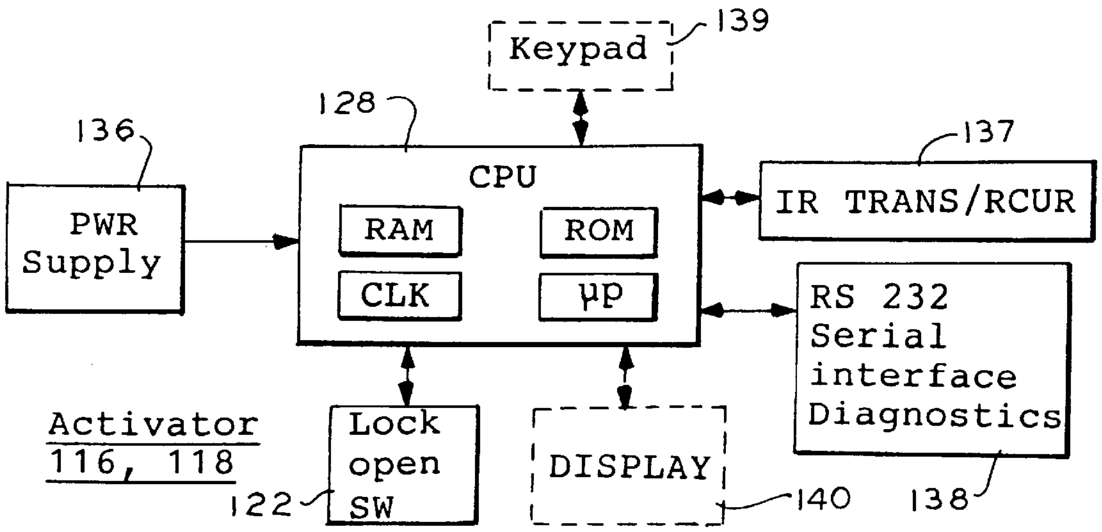
FIG. 13 is a circuit diagram illustrating the circuit of a basic activator in solid line and an advanced activator in solid and dashed lines.
Figure 18C:
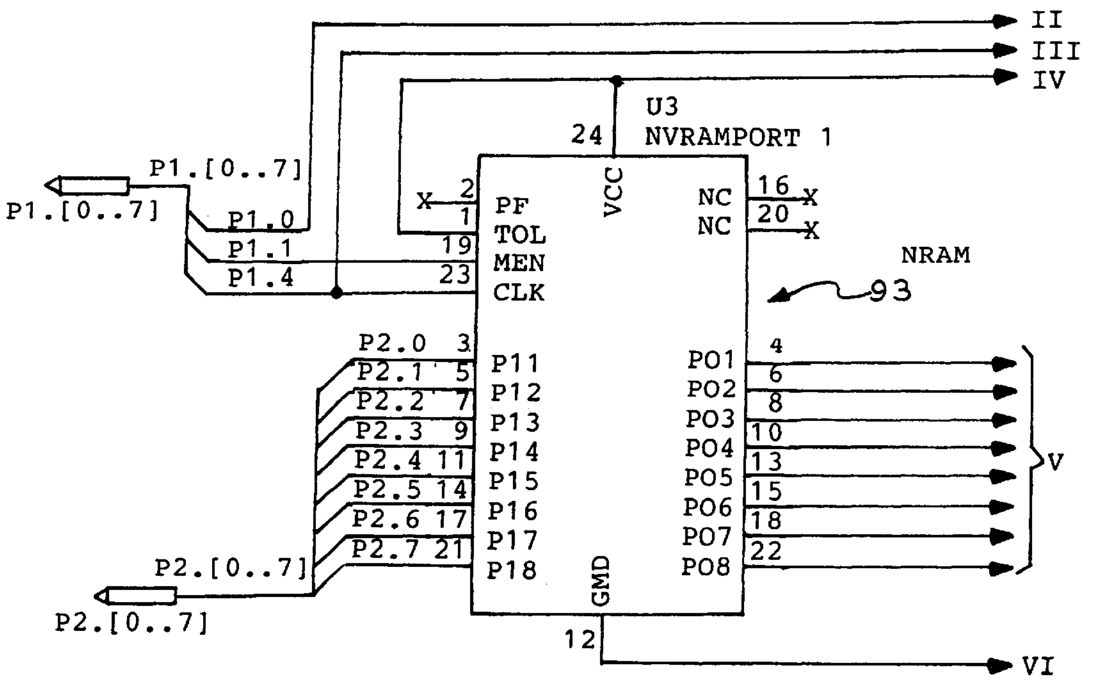
Figure 18F:
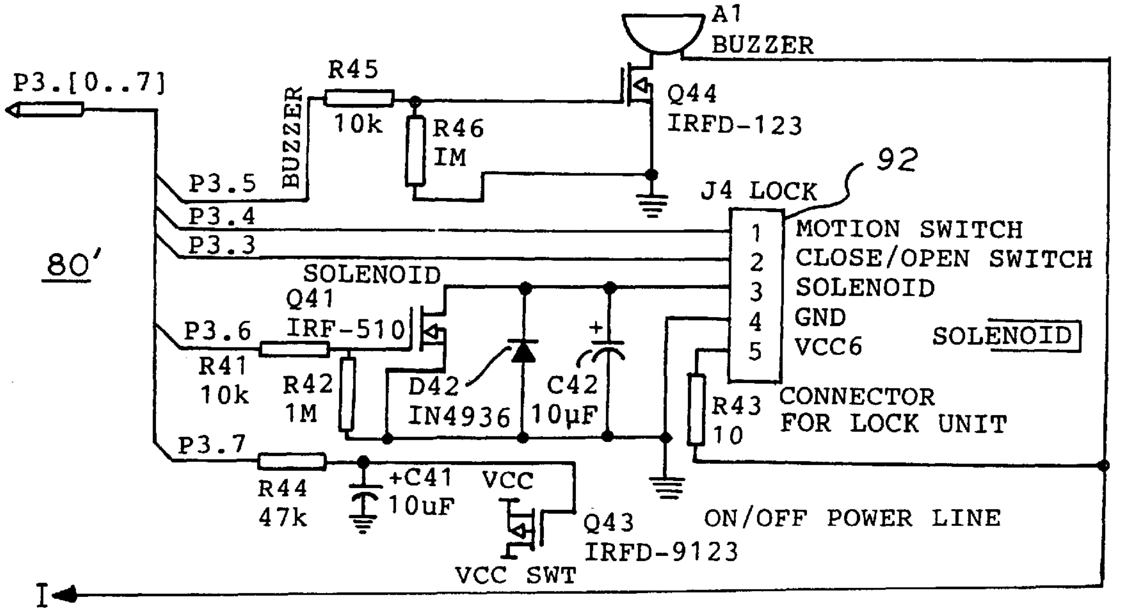

In FIG. 13, the activator 116 also includes a power supply 136 which may be a lithium or alkaline battery coupled to the voltage regulator such as regulator 108 of FIG. 18*a*. Also, the activator includes an IR transmitter/receiver circuit 137 such as circuit 100, FIG. 18*c*. An RS 232 serial interface 138 is also included.

The activator 116 communicates with the lock control unit 6 via the activator IR transmitter 124 and the control unit 6 IR receiver 86 by depressing switch 122.

The basic activator 116 is programmed through its IR 126 receiver from an Activator Programming Unit (APU) 132, FIG. 11, in a central dispatch unit 134. The program instructions include the ID and access code of the user, times and dates that the activator can be used and the number of times that the activator can be used to open a lock. Also, the lock number is programmed into the activator.

Activator Programming Units (APU) 132 are small desk top housings about the size of a telephone which contain the IR communications links and hardware. Activators are programmed by insertion into APU's located in user terminals and offices. Each APU 132 is connected through a serial port to the user's on-line dispatch control system. In some applications the APU may be connected to a stand-alone PC system.

Activator holders insert their activators into the APU to identify themselves to the central dispatch unit 134 which programs or changes the activators for their assigned tasks.

Figure 15:
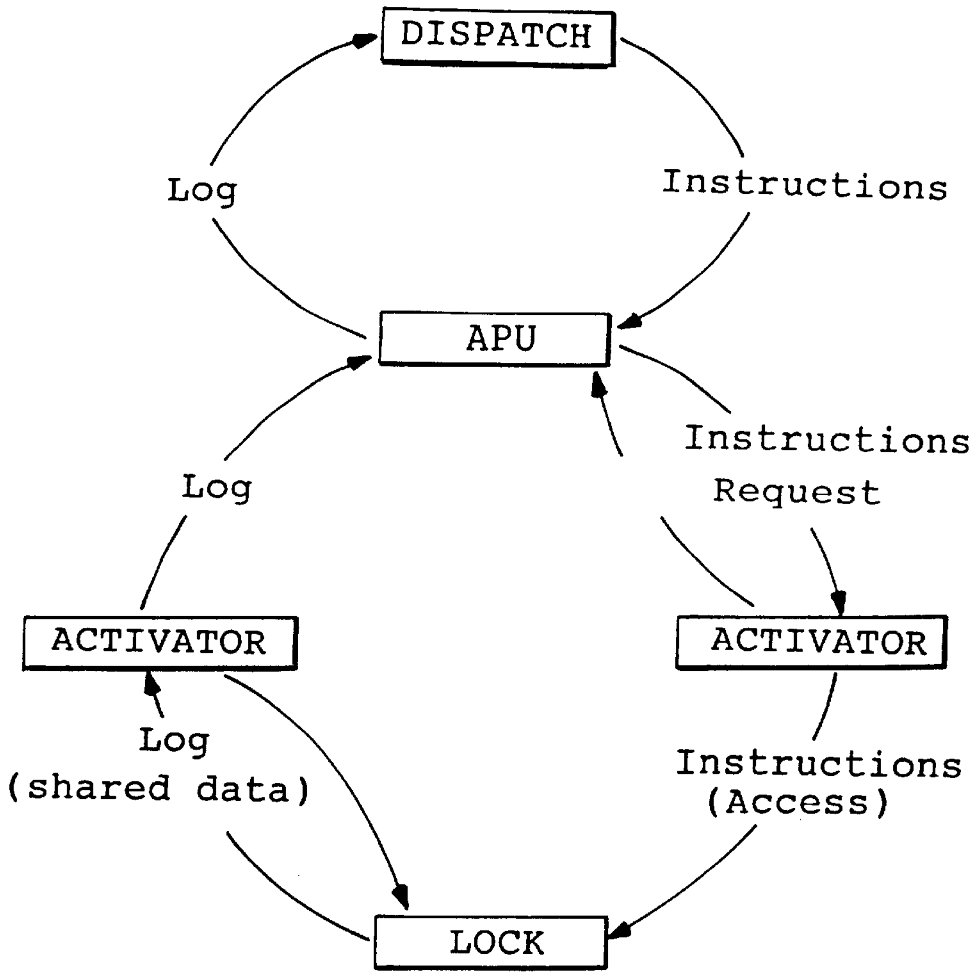
FIG. 15 is a state diagram generally showing the information flow for the system of FIG. 11.

In FIG. 15, the term "key" refers to the activator. The activator 116 may be used only on a given work shift by one individual for one or more lock control units. That individual is identified with a personal PIN number and an access code which is programmed into the basic activator 116. If the lock number does not match the information programmed into the activator, or the time or date does not match, the activator will not open that lock. If the lock is programmed to be opened by a specified activator, it will not open if the activator does not match. The lock will record all attempted transactions, whether or not successful by recording the activator, number of attempts to open the lock and the ID of the activator and the PIN of the user. If the activator attempts to open a lock incorrectly a number of preset times in a preset period for a lock control unit, the lock enters a lockout mode and will not open. Special situations may include drop and carry, specified times and dates and other non-typical situations.

In FIG. 15, a flow diagram of some of the instructions illustrates the information that is conveyed to the basic activator. However, others of the information conveyed in FIG. 15 relate to the advanced activator 118, FIG. 11.

The basic activator has no display and does not perform the many more functions of an advanced activator 118, FIG. 10 such as receive log data from the lock control unit. The basic activator 116 only requires an ID and access code of the user. It can only open locks where the user has a valid ID and access code. Also, it resets the real time clock of the lock control unit automatically if the control unit shows drift in time.

The basic activator does not receive data from the lock control unit 6 it operates. However, the lock control unit 6 logs the data about that basic activator 116 when it attempts to open the lock. This information is later downloaded by the advanced activator 118 to the central dispatch unit 134, FIG. 11 for administratively reporting the activity of that lock and other lock assemblies 2 operated by the basic or advanced activator or lock control unit 6 keypad. The information reported also includes attempts at opening a lock assembly, granted or denied and unauthorized attempts to open a lock with the ID of the lock An individual thus can operate a lock control unit 6 by the keypad on the lock control unit 6 or by a basic activator 116 in a more complex system, such as for a small fleet operator. The basic activator can be programmed to open one or more locks in any desired time frame, for example in an 8 hour shift. The associated lock control unit 6 records the basic activator data as it is used as discussed above for later retrieval by the advanced activator 118.

The basic activator can be programmed with multiple security levels equivalent of master keying. In any case, the lock control unit 6 records all activity of the basic activator 116 (and the advanced activator 118). The basic activator 116 will not open the lock 4 if the programmed time period to open the lock of the activator 116 has expired or if the usage limit of the lock is not programmed for a particular PIN number. The lock assemblies 2 control units 6 are preencoded with a table of PIN numbers and access codes for use with activators or the keypad 84 of control unit 6. To retrieve log data from locks with a basic activator requires manual recordation directly from the control unit 6 display. To use the basic activator, step 1 of Table II is carried out. Steps 2 and 3 are automatic for the basic activator. The user must first enter the "*" key on the lock control unit keypad 84 to wake up the control unit 6 CPU. The switch 122 on the activator is then depressed which communicates the operator access code and PIN number encoded into the activator via the IR ports. The control unit 6 then logs the appropriate information about this opening in its memory.

The Advanced Activator

In FIGS. 10, 11 and 13, the advanced activator 118 includes a circuit similar to the lock control unit, FIGS. 18*a,b,c*. It differs from the basic activator 116 by including a display 140 such as employed in the lock control unit 6 and a keypad 139 similar to the one used in the lock control unit 6. The display 140 is shown in phantom in FIG. 13 as is the keypad 139. The memory in the advanced activator is greater than for the basic activator for storing downloaded log data from the lock units 6. The activator 118 can retrieve log data from the locks and can program the Ids (PIN) and access codes therein via its keypad.

All locks can be unlocked by all authorized advanced activators 118. When used to unlock a lock, all activators, advanced or basic, leave an imprint of its ID in the lock control unit 6 memory. The advanced activator 118 can retrieve, for example, 1000 records from locks.

The advanced activator 118 includes a buzzer to provide an audible indication of a full memory and unit deactivation. It requires reprogramming to function past a set time and/or number of uses, or its memory is full. It is also programmable to determine record selection criteria and has the ability to download lock codes along with authorized activator ID's. Both basic and advanced activators communicate with the activator programming unit APU 132, FIG. 11. FIG. 15 gives an overview of the information transferred with the advanced activator 118.

To use the advanced activator, the steps of Table II are implemented as modified by the activator 118. First the "*" key of the lock control unit 6keypad is depressed (step 1) to wake up the control unit CPU. Steps 2 and 3 are automatic. Step 3 of Table II may be carried out by the advanced activator by employing the numbers of Table III as an option. Step 2, Table II, is carried out automatically by the advanced activator via the IR ports.

If for example a fleet operator has a high value cargo, the activator 118 can be programmed to operate a unique code associated with only the associated lock control unit 6 which is encoded with that unique code. A dedicated individual will be the only person authorized to use that activator which is specially programmed for that person and for that lock. Also, the activator is programmed only for a given time. This maximizes control over the unlocking of valuable cargo.

FIGS. 19 and 20 illustrate flow charts for the lock control unit 6 and activators 116 and 118. The hardware status is checked. This step means checking the status of the RAM memory of the lock control unit 6. When the lock control unit 6 wakes up upon depressing the "*" key, its CPU checks its memory for specified memory values at given addresses indicating no catastrophic power outage has occurred. If addresses are not set to proper values, the unit assumes a power outage and proceeds to reinitialize to its default settings. For example, it inserts a copy of Table V as its valid access table in place of preprogrammed codes programmed by the user to replace initial factory set default codes, Table V.

During initialization, the CPU 92 of the lock control unit 6 turns on the display 82 and the IR transceiver 100. When the unit goes to sleep, it turns off power to all high power drain devices in the lock control unit 6 not needed during idle time, such as the display 82 and IR transceiver 100. The CPU 92 is put into a low power sleep mode. This procedure needs to be undone during the initialization step to use the lock.

The CPU in the sleep state is operating at its lowest power consumption rate to just keep its memory refreshed. When the keypad is activated, a designated key "★" is wired to the CPU and when depressed forces the CPU into full power operation. The CPU 100 then performs the memory checks discussed above. The CPU then turns on the remaining high power drain devices.

Action time refers to a drop and carry operation where the lock control unit 6 automatically opens after a given set time has expired. Lockout refers to manual security timeouts in which there are too many predetermined invalid attempts in a preset time period, e.g., five minutes. If a valid master key ID/PIN code, three different codes being assigned, Table V, is entered, the lockout is disengaged and the lock opens. The three codes in the table V are noted as keypad code, terminal code and master codes. All codes in Table V are changeable by the user with the "master lock programming" code, Table V. Otherwise, the lock 4 does not open until the lockout timeout period has elapsed.

The lockout period has a default setting of one hour and is programmable to 12 hours. The lock will operate normally when that lockout period expires. During the lockout period the lock control unit 6 will show "timeout" on the display 82 and go to sleep.

If the lock is still locked and the set time is not reached, a master key ID/PIN is required to open the lock.

If the action time is not reached, the flow chart shows the other modes that can open the lock prior to it being programmed to open, if so programmed. The Program Lock Retrieve Information step refers to the use of the advanced activator. The flow chart is otherwise self explanatory.

In the "Open Door" mode in FIG. 19, the lock control unit 6 displays a prompt "push" on the display 82 requiring the operator to push the J-hook handle 16. This was discussed previously where the lock 4 plunger 24, when partially displaced, displaces the switch 46 contact 46' which changes the switch state and in turn tells the CPU that the door is being opened. At this point the solenoid 50 is momentarily pulsed by a signal initiated by the CPU to open the lock as discussed. After the door is opened, the CPU checks the microswitches 46 and 70 (FIG. 6) for status. If the switches are inconsistent, a message, Table IV, is given on the display 82.

An entry is made into the lock log at this time that the lock has been opened. This information includes the PIN, the ID of the activator if applicable, and the time at which the door is opened. The lock control unit 6 now goes to sleep. When the door is closed, the log entry is completed by adding the closure time.

FIG. 20 illustrates the flow chart for the activators. The advanced activator has more functions, e.g., retrieve log data and is capable of programming via its keypad. Some of these functions are illustrated in FIG. 19 and are not shown in this diagram, FIG. 20. FIG. 20 shows in phantom two steps that are performed by the advanced activator not performed by the basic activator. These include pass lock information and request lock log. This information is stored in the advanced activator for later downloading by the system.

The Central Dispatch Unit

Figure 12:
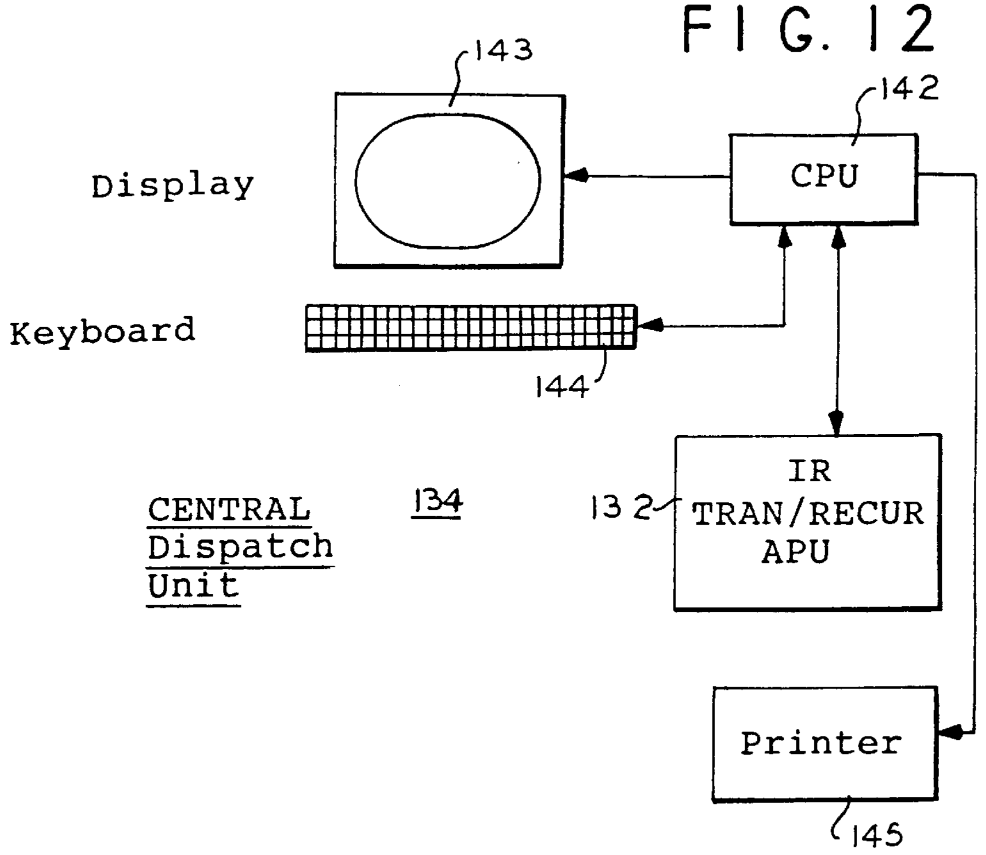
FIG. 12 is a diagram showing the central dispatch unit of FIG. 11.

In FIGS. 11 and 12, the central dispatch unit 134 includes a CPU 142, a display 143, a keyboard 144 and a printer 145 in addition to the APU 132. The unit 134 is a small operation, for example, may be a personal computer in a stand alone operation. In a large system it may be part of a main frame computer coupled to other personal computers at various terminals. The APU 132 receives the activator 116 or 118 and communicates with the activator through the IR transmit/receive ports. The APU conveys information from and to the activators in accordance with the flow chart of FIG. 15.

The central dispatch unit 134 in addition to programming the activators, provides administration of the system using display windows as exhibited by the screens in the appendix. These screen displays may use Microsoft Windows applications and may be set up via any commercially available software such as Microsoft Access, a computer programming tool available from the Microsoft company.

The system tracks terminals, personnel, vehicles, locks and activators. It generates a number of reports and handles administrative functions.

For example, the system will add, edit, delete terminals, vehicles, locks (individual or fleet), personnel, activators and record return of activators, assign activators and interrogate activators. Further, reports can be generated with lock log information including vehicle ID, first time lock is open, date lock is opened, last time lock is closed, date lock is closed and number of openings in a time period recorded. The report can show detailed information for every instance of a lock opening on all vehicles in a fleet.

Also exception reports can be generated showing exceptions for particular locks that are opened and closed with times of openings and closing. Battery status is also given in a report. The reports can provide information on lock, activator and personnel history and location. Further, administration information is provided including defaults for various parameters not specifically set on locks, activators and personnel. Access to the system can be selectively provided at different levels to clerical, supervisory and management personnel as desired.

The system is first initialized. For large operations with a number of terminals the data about the other terminals needs to be entered. Terminals are assigned unique ID's for multiple terminal facilities. Terminals are selected, added and deleted and edited via an edit menu.

Personnel are then initialized. The data could relate to one terminal or all terminals. Basic information about the personnel is added, edited or deleted. All relevant information about personnel is added including assigned PIN and access codes. Personnel information includes names, Ids and social security numbers. To enter access codes requires security clearance. This requires the use of two encryption codes for communication with activators. The user assigns access codes and permission levels to personnel in the data base. Access to this data base is given only to users with security clearance.

Vehicles are initialized in a table with ID, type and terminal assignment. Locks are assigned to vehicles and this table correlates vehicles in the system.

The lock table is initialized. This requires security permission. Various data regarding the lock is entered into the system including ID, assigned vehicle ID number and security number. The lock data can be accessed knowing the vehicle ID. Each lock has an ID number, serial number, model number and security number. The first is an arbitrary number assigned by the user and the latter is an electronic number embedded in the lock microprocessor. The data base on the lock is kept consistent with the state of the lock involved. Clerical permission results only in some of the form information being displayed.

The final stage of installation is a Security/Update report for a person with security permission, including terminal, vehicle, lock programming information and new lock parameter settings. This information is loaded into a supervisory activator or printed. A list of locks programmed into an activator can be uploaded into the data base system. The programming of the lock can be done by the keypad, but one with security permission can update the data base.

The following information is best read in reference to the screens in the appendix.

Initialize the Activators

Activator are added to the system by one with security permission. Activator defaults are set as to whether it is on line-haul or local at the terminal and include parameters for using the system. Defaults are shared with personnel defaults. The activator is added to the system and the assigned personnel listed.

Initialize Lock Log History

Lock history is downloaded from the locking units by advanced activators and stored in the central data base or done manually by keypad which is more laborious.

Using an Activator

At the beginning of a shift, a user is assigned an activator and has it programmed via an APU 132 at the central dispatch unit 134. From a personnel table, the user PIN and activator ID are extracted. The activator ID is used to access the activator table and obtain operating parameters, e.g., time of day, dates, etc. for that activator. The encrypted data table is decrypted by one with security clearance to obtain the access code for the user. This information is downloaded via the IR receiver into the activator and includes terminal ID. The unit is now activated. If the unit is advanced, resident log histories are downloaded into the central unit for security analysis. The lock log history in the activator is purged and the unit returned to the user.

Information in the various window screens can be browsed, accepted OK or canceled as in commercially available Microsoft Window applications. OK can be used only if the needed information is entered. Add, edit, delete information on the terminal is employed as needed.

Personnel

In respect of personnel, they are not deleted from the data base, but marked inactive. This permits historical data to be interpreted correctly. The information is tracked by the data base as is all information entered into the system.

Locks

Locks are tracked for inventory and for information to manipulate the locks. Locks are identified with the electronic serial number and with the corresponding vehicle ID number. The lock is added as required to the system data base. Browse function permits to determine the location of every lock in the system whether installed or in storage.

Install

To install a lock, two methods are used. One is automatic on the add form stating yes to the question. This is for a lock immediately attached to a trailer or truck. The other method is manual. The lock unit data is retrieved using browse. The data is then copied automatically onto the form. Installation date by default is the current date but could be set to any date.

Security information is shown to people with supervisory permission. Three access codes "keypad", "Terminal", and "master" are master codes and will work with any PIN number. "Keypad" code will open an individual lock after security time out has been reached (the time for opening the lock by its preset time period has elapsed). "Terminal" code is common to all locks at a terminal and used by management. "Master" code is used by the company for all of its locks. Data access codes work with any PIN number. This permits the log to be dumped, for setting the clock in the lock control unit and for programming the lock control unit. PIN numbers can be displayed that are valid for a given lock which are contained internally that lock including access codes. Only PIN numbers are shown. Access codes are taken from personnel data. Browse can be selected for a lock to be installed with the manual menu option used. This is for a lock removed from storage and to be used.

Edit

Editing can be done on individual locks, e.g., drop and carry, and on fleet defaults for locks used on an entire fleet or terminal.

Individual Lock—Fleet

Remove

To remove a lock from the fleet in case of battery replacement, removal of the truck from the fleet or the lock is damaged, a lock record is selected. The lock can be removed or reassigned at this time.

Delete

Activators

Activation ID (user assigned serial no.), Activation serial no. (mfr. no.) and model no. (mfr. no.) are taken from the unit case and used to add the activator. The activator is assigned at this time to one or more persons.

Assign

Two methods of assign are used. One is automatic and the other is by selecting the assign menu option in the screen and move to the form manually. The activator is selected in the screen and moved onto the form automatically. The date the activator assigned is entered and the usage limit entered. (The number of locks that can be manipulated before the lock needs to be reprogrammed by the central dispatch unit APU 132 is entered).

The time interval for the unit is assigned. This may be in hours, days, weeks as appropriate. Once the time limit has been reached on the assignment, the activator can not be reprogrammed by the APU. The starting time and ending time are set and which days of the week the unit can be used are set. By varying the settings, various people may use that activator with individual settings set by the APU.

Return

To return the activator, the date and who is returning it must be entered. The current date is by default. The activator may be reassigned at this time on this form. A "browse" button will pop-up a list of the activators in the system. The unit may be selected for storage on this screen or it may be deleted from all records.

Delete Activator

Browse in this screen permits all activators to be viewed and the desired one is selected to be deleted. The assigned person is listed and the unit can be deleted from all records. The person can be deleted for this unit.

Interrogate

This screen-relates to the individual and the activator. The assignments can be browsed and indicates the valid interval of usage.

Reports

A number of standard reports may be generated via screen forms.

Activities—lock

In this form, start and stop date can be selected. Lock serial number and vehicle ID are entered to identify the lock unit. The report will be limited to events between the selected dates. If all records are needed the dates are omitted. A particular lock can be selected by the "browse" button.

User

A fleet report and individual report can be selected from this screen. The date range is also selected if desired. The individual or his PIN is selected. Events are limited to the selected dates. If all events are required, no dates a re entered.

Exception

Exception reports indicate events of significance in the data base. The supervisory activator is periodically uploaded into the APU 132 for archiving and analysis. Manual inputting via a keypad is not cost effective.

Time Open

This is the amount of time the lock unit was open (and the door). The full fleet or individual lock can be reported. A person by name or PIN, a terminal location by terminal ID or locking unit by vehicle ID can be selected for the report. Times of the report can be restricted to set times and dates. The data base is not modified and the information can be printed.

Time Closed

This is a second type of exception report based on the amount of time the lock was closed (and the door). Similar information can be obtained as noted in the time open report.

History

This is used by supervisors. This is based on the lock logs and summarized using an advanced activator.

Lock

Full fleet or specific lock control unit. Lock data can be displayed in spreadsheet format and the user select the particular lock. When selected the lock serial number is copied into this form. Dates can be selected or all records as desired.

Activator

Full fleet or specific unit can be reported similarly as described above for the lock.

Personnel

Full fleet or individual can be selected. Name or PIN can be used to call up information about a person. Browse selects a spreadsheet of all individuals who can be selected therefrom. When selected the information is copied onto the history form.

Administration

This requires security access to view or change. These screens represent the allocation of resources and are not for casual users. With the appropriate permission, fleet defaults may be set for all locking units, activation units, and personnel. These defaults are automatically included when the items are added to the data base.

Locks

Fleet default edit mode sorts a number of groups of different information. There is the access code for the locks, the keypad code, the terminal codes, and the master codes. There is also the data access codes for the lock, the log code, the clock code and the program code. PINs are assigned that will be default set for the lock control units and as indicating if they will open all locks.

Manual keypad security parameters are given in a screen. This indicates how many tries are permitted with improper PIN/access codes before disabling the lock control unit in a specified time period. Also, an estimate is given for battery replacement and low battery indication. A default may be set as to when the lock can be operated. The data base should be synchronized with the information held by the lock control units 6. Updates are stored and a report generated as to every lock in the fleet that needs to be updated. These changes are carried out automatically using an advanced activator or manually by keypad. Once the system confirms changes are made to a lock control unit, then its record will be updated to reflect the new defaults that are now operational.

Activator

In defaults for the activator, there is terminal location, type and usage limit. There are limits for the activator in time, day and week. Once the assignment period has elapsed, the activator can not be programmed until it is reassigned.

A default is for access time control. This is for start hour of access period and end hour. It is possible to select certain days of the week to permit access. The lock will not open in days outside the assigned days.

Personnel

Personnel defaults include title, access code, PIN and access level. Also, it is indicated if activator assignment is standard. The terminal default location is selected. A default activator unit information is included including serial no., type, number of usages permitted before the unit must be reprogrammed at the APU. The period the unit is assigned is set including hours, days and weeks. An Activator unit will not communicate with a lock control unit 6 outside the set periods.

Access

There are four levels of access to the entire system. One level is the basic end user. He has a PIN/access code that can open one or more locks that can be entered either by hand through the keypad or by using a basic activator. The next level is the clerical. They are responsible for entry of data into the data base such as adding and deleting personnel, lock control units, and activators and generating usual reports. Management are allowed to change PINs, view and change the second and third level access codes, and reset the time of the system.

Management Access Screen

Supervisory persons can perform all of the functions of a clerical person or management person, but can also change the system/fleet defaults.

Clerical persons get data into the system such as routine addition of locks, activators, and personnel. They also run routine reports and route information to the responsible people.

Management persons can do all that clerical people do and also program the APU to program the supervisory advanced activators. These advanced activators can reprogram the lock control unit subsystems of the data base. They can also run the security reports to determine if a security problem is present.

Supervisory persons can do all that management can do but also have control over the security subsystem of the data base system. They can initiate changes in the master key codes, the manual keypad security parameters and the security keys for communication with the activators.

The Hardware

The hardware administration screen is for an MS_DOS operation where each application is configured for the system being used. It is preferred that the hard disk size and ports for communication and printer be a Windows configuration.

In FIG. 21, a flow chart is given for the central dispatch unit. 134. This chart is self explanatory.

Figure 16:
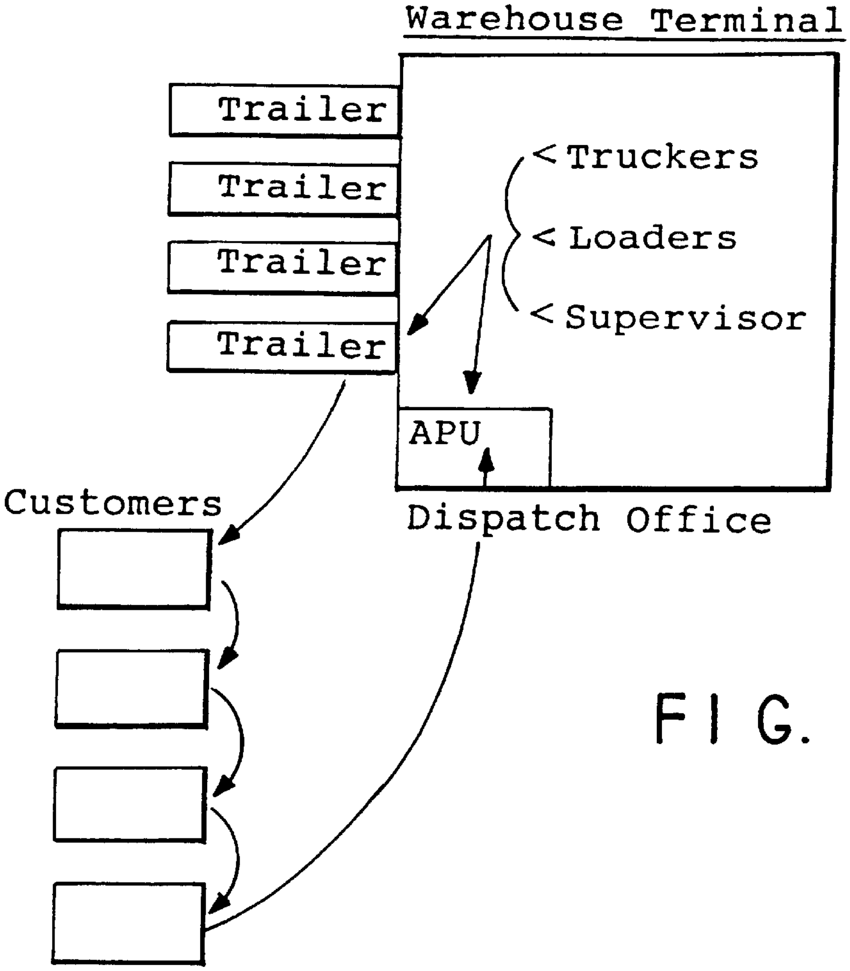
FIG. 16 is a flow chart illustrating the flow of information in a closed ended small distribution system of FIG. 11.

In FIG. 16, a closed ended system is shown for a small fleet operator who delivers, for example, the same goods within a local area. The system uses a number of trailers and has a given number of the same customers. There is only one dispatch office. Time of delivery can be programmed and/or the number of door openings can be limited using the activators. The activators are distributed to all employees who are in need for a given shift or period. The activators can be distributed to customers for preventing trailer access by drivers, which is not typical. Normally customers are not given activators. The activators to the customers can be used on all trailer locks in the system if desired.

In one embodiment, it is possible that no activators are required to be used for this system. In this case, the lock control unit 6 keypad is used to obtain access to the locks. A unique code may be assigned to each trailer in the system.

Activators, when used, and locks can be programmed for time and date of delivery and or number of door openings.

In FIG. 17, an open ended system is one including a large number or multiple terminals and a large number of trailers or trucks that travel to and among the different terminals. This system can include a local dispatch office and a central office with a main frame computer. In this distribution system, the fleet operator already has in place a large integrated computer system for tracking goods and trailers. The system of the present invention is programmed into such a system incorporating data bases already in place. Such programming can be implemented by the fleet operator.

Each terminal has its own APU 132 and central dispatch unit 134. Supervisors access all trailers at their facility and harvest log data. An advanced activator is utilized to download all necessary data about each lock and trailer. Activators can be programmed for special loads which may require driver access to the locks enroute. All this is monitored and controlled by the central dispatch units 134.

The disclosed system combines information processing technology with mechanical locking devices to make substantial permanent cargo security practical for the first time. The system solves the logistical problem of matching lock keys to the proper trailer at the correct location.

The success of this system will depend upon the following fundamental criteria.

1) Reliability

Lock failures have a disruptive effect on customer's operations. System components are arranged to meet the highest standards of quality to insure high reliability.

2) Durability

The electronics is designed to survive the extremes of temperature, vibration, contamination, and shock.

3) Usability

The design takes into consideration the end user—truck driver, dockman, and supervisors.

Consequently, the lock components are arranged to survive 10 years of normal usage: 1) Average of 15 openings and closings per day; 2) 250 days of use per year; 3) 1500 hours of over-the-road use per year.

Heavy use operations required a minimum of 5 year life: 1) Average of 60 openings and closings per day; 2) 250 days of use per year; 3) 1500 hours of over-the-road use per year. A hardened steel plunger 24 is of sufficient diameter to discourage compromise of the lock by cutting or prying attack. Allowance is made to prevent wedging of a worn J-Hook between the plunger and the trailer door. Plunger travel, preferably about ¼ inch, accommodates commercial J-Hook assemblies with variations in plunger length.

The keypad is flat, sealed from the elements and able to withstand physical and environmental attack. Minimum pad size of ½" square facilitate use with gloves.

The disclosed security system combines information processing technology with mechanical locking assemblies 2 to make substantial permanent cargo security practical for the first time. The system solves the logistical problem of matching lock keys (activators) to assigned trailers at the correct location. In addition, the system provides an "automatic" log of entry which includes user name, time and date that replaces the need for expensive seal systems.

The disclosed system eliminates the need to physically transfer keys. Loaders and drivers are not depended upon to take extra steps to secure a trailer. The locking assemblies 2 lock automatically in normal existing operations.

The lock assemblies 2 work with existing hardware to minimize cost and installation. Interfacing with the J-Hook is an ideal solution as the J-Hook provides the most rugged and complete sealing of the trailer door. However, other door locking arrangements not employing the J-Hook can be locked using conventional dead bolt arrangements with the plunger 24 providing the dead bolt.

The locking device is easy to install with minimum modification to the trailer door or frame to merely attach the lock assemblies 2 to the door or frame.

The system eliminates the need for throwaway seals and provides means to monitor unauthorized access to trailers. The system integrates into existing dispatch control and terminal operations.

In Summary

Each lock control unit 6 is programmed to perform the following functions:

Screen activator inputs for proper encrypted codes

Log both legal and illegal entry attempts, recording user ID, date and time

Monitor battery power to alert users when power reaches 25% of charge

Auto lock and unlock based on instructions received from advanced activators

Activators are programmed to perform the following functions:

Limit activator usage to a specified time, length of time, and/or number of uses Communicate proper encrypted codes to activate locks Interrogate lock memories to retrieve access log data Download access data to central control through the APU Data Base User companies maintain a current data base of authorized activator holders. When user activators are inserted into the APU 132, the system software first checks the system data base to determine whether or not the user is authorized access. Unauthorized activators are neutralized by the downloading of a code which prevents their further use. Authorized activators are programmed with appropriate coding.

Small user firms may elect to use a PC-based stand-alone system which houses communication software, activator and lock programming software, and user data base.

Most major user firms will require custom software integration into their dispatch control systems. The writing of this code will normally be completed by the user's own personnel.

Access Control

A user gains access into trailers and containers protected by the system by inserting an appropriate activator in an APU 132 which audits and programs the activator and then communicating the activator with a truck or trailer lock control unit 6.

When an activator 116 or 118 is inserted into an APU 132, the user's ID is scanned and compared to the system's data base of authorized activators. The program which charges the user's activator sets limits on the duration, time, and number of usages. At the end of the shift, or after the prescribed number of uses, the activator will no longer function and must be reprogrammed in an APU.

Security Levels

Two overall levels of security are available with the system.

Standard Coding

The majority of operations utilize standard coding. All trailers within a user's fleet will be coded the same. Access will be limited by activator control and the log of user access maintained in each lock. This method is feasible because of the time limits programmed into activators making them unusable when reported lost or stolen.

Unique Coding

The highest level of security is obtained by assigning a unique encrypted code to each trailer and limiting access to that trailer to specific individuals during specific time slots. This type of coding best fit operations with very high risk/high value cargo; limited access frequency and highly predictable routing.

User firms's operations and staffing will vary and may include the following personnel who will normally need access to trailers; Internal: Dock supervisor, city driver, dispatcher, line haul driver, mechanic, security, manager. External: Drop and Carry—shipper and receiver; Exhibits—receiver; vendor mechanic, cartage agent, interline carrier, police, fire, and state inspectors.

The versatility of the system allows for access authorization unique to each individual based upon their job requirements.

Daily Unlimited Access

Activators are programmed to provide unlimited daily access to trailers to dock supervisors, dispatchers, city delivery drivers, mechanics, and managers. At the beginning of each shift the user will insert an activator into an activator programming unit (APU) 132 of the central dispatch unit 134. The APU 132 reads the identity of the activator and checks it against the central record of authorized activators. If the activator is on the authorized list the appropriate encrypted codes are downloaded to the activator to allow access to all trailers which the user will work during the coming shift.

At the same time, the activator is programmed to deactivate upon the conclusion of the shift, rendering the activator useless until reactivated at the beginning of the user's next shift.

Extended Limited Access

Line haul drivers will not generally require access to trailers. However, special situations such as weight and material inspections make it necessary for them to have emergency access. Line haul driver activators can be programmed in the same manner as the above, or for longer time periods (e.g., 1–2 weeks) but for a limited number of uses (1–2). The exact parameters for this is programming will be determined by the user firm's dispatch control system.

Extended Multiple Access

Terminal managers will require a fail-safe method for access in the event of terminal power failure or dispatch control system blackout. Each manager will be issued emergency activators which may be kept in a safe for storage and which allow multiple uses for an extended period of time.

Terminal manager activators are programmed in the same manner as other activators except that they may be used for a high, but limited, number of uses (50–100) and for an extended, but limited, time (1 year).

Loss of an activators potentially compromise the system up to the limits of the activator's program. The activators must be treated with the greatest care and secured when being held for emergency use.

Lock Toggle

Locks installed on trailers delivered to other carriers, or to customers in drop and carry operations, may be toggled into the unlocked position. This means that the lock control unit 6 is programmed to open at a specific time and date. Instructions to toggle the trailer come from the central dispatch unit 134 through the APU 132 to a dock supervisor's or driver's activator.

Emergency Reprogramming

If the system is compromised by the loss of an extended multiple access activator, every lock can be reprogrammed with new encrypted codes in the normal course of business over several days. Activators can be programmed to reprogram the system's locks with new codes.

Use of an electronic activator leaves a record of access. The knowledge that this audit trail exists is a powerful deterrent to employee theft.

Data Harvest

Each time that an activator is used with a lock it can be used to copy of the entry log. The record in the lock remains unchanged. This harvested information can be downloaded to the central system when the activator is next inserted into an APU 132.

Central Record

The information received from each activator usage is first checked against the existing record for duplications. This step is important because of the built-in overlap of data retrieval. Every activator could retrieve some information already retrieved by other activators. This reduces the value of an employee thief throwing away his activator.

With duplicates removed, the central system has an accurate on-line database which can be accessed by security and management at any time. The availability of this database ties directly to future system expansion and integration.

What is claimed is:

1. A lock device comprising:

a lock including a locking member having a first lock position and a second unlock position;

log means located within the lock for electronically recording and displaying data manifesting the number of times from a reference value the locking member is placed in the unlock position and for recording and displaying data manifesting the number of attempts at unlocking with the correspond ID code and the time of occurrence of each said unlocking and attempts;

coding means associated with the lock including a personal identification (ID) code means having an ID code associated with at least one individual and access (ACC) code means having an ACC code associated with the level of authority of the at least one individual for cooperatively permitting the at least one individual to unlock the lock upon entry of said codes; and lock enable means associated with said coding means for said permitting the unlocking of said lock by said at least one individual only for a given number of times in a predetermined time period.

2. The lock device of claim 1 including optical transmitting means including a second personal identification (ID) code means having a second ID code associated with the at least one individual and second access (ACC) code means having a second ACC code associated with the level of authority of the at least one individual, said first and second ID and ACC code means for said permitting when the second ID and ACC codes are transmitted and entered into said lock coding means and match the first ID and ACC codes in the lock.

3. The device of claim 1 including disabling means for disabling said coding means in advance of the end of a given time period for permitting the lock to be unlocked without entry of said ID and ACC codes at the end of said given time period.

4. The device of claim 3 including means for disabling the disabling means.

5. The lock device of claim 2 wherein said optical means includes portable receiver means for accessing and receiving said data.

6. The device of claim 1 wherein the lock includes display means for selectively displaying said data.

7. The lock device of claim 1 including means associated with the lock for electronically recording and displaying each time when the locking member is placed in the unlock position in a given period.

8. The lock device of claim 1 including means associated with the lock for electronically recording and displaying the ID code of the at least one individual placing the locking member in the unlock position.

9. The lock of claim 1 including programming means for programmably setting said codes of said ID and ACC code means.

10. The lock of claim 2 including programming means for programmably setting said codes of said lock and said optical transmitting means.

11. The lock of claim 1 including programming means for programmably setting said given number of times and time period of the lock disable means.

12. The lock of claim 2 including display means on said lock and on said optical transmitting means for selectively displaying said data.

13. The lock device of claim 1 wherein the lock includes circuit means for recording and displaying the activity history of the at least one individual including when and the number of times the locking member is placed or attempted to be placed in the unlock position for each ID code.

14. The lock device of claim 1 including input means associated with the lock for inputting said codes and for accessing the log means, said input means including at least a manually operated keypad and display means associated with the lock for selectively displaying said log data.

15. A lock device comprising:

a lock including a locking member having a first lock position and a second unlock position;

coding means associated with the lock including a personal identification (ID) code means having an ID code associated with at least one individual and access (ACC) code means having an ACC code associated with the level of authority of the at least one individual for cooperatively permitting the at least one individual to unlock the lock upon entry of said codes;

lock enable means associated with said coding means for said permitting the unlocking of said lock by said at least one individual in a predetermined time period; and means for automatically assigning a different unique serial number to that lock responsive to and at each time the lock is unlocked, and for recording that serial number in that lock.

16. The device of claim 15 wherein the means for assigning a serial number comprises memory means for storing a reference number and means for updating the reference number with a new number each time the lock is unlocked.

17. The device of claim 16 wherein the means for updating includes incrementing the reference number by a given value each time the lock is unlocked.

18. The device of claim 16 wherein the means for updating includes adding a random number to the reference number.

19. The device of claim 15 wherein a cargo storage apparatus is assigned a unique identification, the device for locking the storage apparatus, further including means for assigning the lock with a unique serial number associated with the storage apparatus unique identification.

20. The device of claim 15 including first and second electronic keys for opening the lock, the first key including a central processing unit, memory associated with the unit, a keypad and display means for entering said codes into said memory and communication means for entering said codes from the first key into said lock, said second key including preprogrammed programmable means programmed with said codes, a single switch and communication means for communicating and entering said codes from the second key into said lock in response to operating said single switch.

21. A lock device for locking the cargo door of a transportation cargo unit comprising:

a lock including means for securing the lock to said door and including a locking member having a first lock position and a second unlock position;

keypad means secured to the lock and including log means associated within the lock for electronically recording and displaying data manifesting the number of times from a reference value the locking member is placed in the unlock position and for recording and displaying data manifesting the number of attempts at unlocking with the correspond ID code and the time of occurrence of each said unlocking and attempts, the recording means being located in the lock;

coding means associated with the lock including programmable personal identification (ID) code means associated with at least one individual and programmable access (ACC) code means associated with the level of authority of the at least one individual corresponding to any of at least three different levels of authority for cooperatively permitting the unlocking of the lock in response to entering of said ID and ACC codes in said keypad means; and means for automatically assigning a different unique serial number to that lock responsive to and at each time the lock is unlocked, and for recording that serial number in that lock.

* * * * *